(12) United States Patent
Lim et al.

(10) Patent No.: US 11,477,621 B2
(45) Date of Patent: Oct. 18, 2022

(54) TECHNIQUE FOR TRANSMITTING MIDAMBLE IN WIRELESS COMMUNICATION SYSTEM

(71) Applicant: LG ELECTRONICS INC., Seoul (KR)

(72) Inventors: Dongguk Lim, Seoul (KR); Jinsoo Choi, Seoul (KR); Eunsung Park, Seoul (KR); Insun Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/594,447

(22) PCT Filed: May 7, 2020

(86) PCT No.: PCT/KR2020/006001
§ 371 (c)(1),
(2) Date: Oct. 15, 2021

(87) PCT Pub. No.: WO2020/226429
PCT Pub. Date: Nov. 12, 2020

(65) Prior Publication Data
US 2022/0150676 A1  May 12, 2022

Related U.S. Application Data

(60) Provisional application No. 62/844,727, filed on May 7, 2019.

(51) Int. Cl.
*H04W 4/40* (2018.01)
*H04W 28/06* (2009.01)
*H04W 84/12* (2009.01)

(52) U.S. Cl.
CPC .......... *H04W 4/40* (2018.02); *H04W 28/065* (2013.01); *H04W 84/12* (2013.01)

(58) Field of Classification Search
CPC ...... H04W 4/40; H04W 28/065; H04W 84/12
See application file for complete search history.

(56) References Cited

U.S. PATENT DOCUMENTS 10,880,895 B2 * 12/2020 Gordaychik .......... H04L 1/1854
2012/0327871 A1  12/2012 Ghosh et al.
(Continued)

FOREIGN PATENT DOCUMENTS

| EP | 3721593 | 6/2019 |
| KR | 1020100117574 | 11/2010 |
| WO | 2019042210 | 3/2019 |

OTHER PUBLICATIONS

PCT International Application No. PCT/KR2020/006001, International Search Report dated Aug. 8, 2020, 4 pages.
(Continued)

*Primary Examiner* — Michael J Moore, Jr.
(74) *Attorney, Agent, or Firm* — Lee Hong Degerman Kang Waimey

(57) ABSTRACT

One embodiment according to the present specification relates to a technique for transmitting a midamble in a wireless LAN (WLAN) system. A transmitting STA may configure an NGV PPDU. The NGV PPDU may include a preamble, a data field, and a midamble. The preamble may include an NGV signal field. The NGV signal field may include information on a transmission period of the midamble.

14 Claims, 32 Drawing Sheets

(56) References Cited

U.S. PATENT DOCUMENTS

| | | | |
|---|---|---|---|
| 2018/0145812 A1 | 5/2018 | Verma et al. | |
| 2019/0097857 A1 | 3/2019 | Zhang et al. | |
| 2019/0268739 A1* | 8/2019 | Cariou | H04L 5/0053 |
| 2019/0280919 A1* | 9/2019 | Sadeghi | H04W 72/04 |
| 2020/0008201 A1* | 1/2020 | Kenney | H04W 72/0446 |
| 2020/0092403 A1* | 3/2020 | Cao | H04L 27/2603 |
| 2020/0132829 A1* | 4/2020 | Jiang | G01S 13/762 |
| 2020/0204417 A1* | 6/2020 | Yu | H04L 25/0226 |
| 2021/0212052 A1* | 7/2021 | Cariou | H04L 27/2603 |
| 2022/0038317 A1* | 2/2022 | Lim | H04L 25/0204 |
| 2022/0158881 A1* | 5/2022 | Lim | H04L 27/2602 |

OTHER PUBLICATIONS

Noh et al., "PHY designs for NGV," IEEE 802.11-19-0293r1, Mar. 2019, 21 pages.
European Patent Office Application Serial No. 20802773.0, Search Report dated Mar. 23, 2022, 9 pages.
Korean Intellectual Property Office Application No. 10-2021-7033292, Office Action dated Jun. 23, 2022, 5 pages.
IEEE Standard for Information technology-Telecommunications and information exchange between systems Local and metropolitan area networks-Specific requirements, Part 11: Wireless LAN Medium Access Control (MAC) and Physical Layer (PHY) Specification, IEEE Computer Society, IEEE Std 802.11 TM, 2016, 3534 pages.

\* cited by examiner (a)

(b)

TECHNIQUE FOR TRANSMITTING MIDAMBLE IN WIRELESS COMMUNICATION SYSTEM

CROSS-REFERENCE TO RELATED APPLICATIONS

This application is the National Stage filing under 35 U.S.C. 371 of International Application No. PCT/KR2020/006001, filed on May 7, 2020, which claims the benefit of U.S. Provisional Application No. 62/844,727, filed on May 7, 2019, the contents of which are all incorporated by reference herein in their entirety.

BACKGROUND

Field of the Disclosure

The present specification relates to a method for transmitting a midamble in a WLAN system and, most particularly, to a method and device for transmitting a midamble of an NGV PPDU in a WLAN system.

Related Art

Wireless network technologies may include various types of wireless local area networks (WLAN). WLAN may be used for interconnecting neighboring devices by adopting networking protocols that are extensively used. The various technical features that are described in this specification may be applied to a random communication standard, such as Wi-Fi, or more generally, any one of the IEEE 802.11 wireless protocol group.

The present specification either enhances the conventional (or existing) IEEE 802.11p specification or proposes technical characteristics that can be used in a new communication standard. The new communication standard may be a Next Generation V2X (NGV) standard, which is currently being discussed.

More specifically, in order to support 2× throughput enhancement, coverage extension, and high speed in comparison with the 802.11p standard system (e.g., DSRC system) in a 5.9 GHz band, the development of the NGV standard (i.e., 802.11bd standard) is being carried out.

SUMMARY

Technical Objects

In the NGV standard (i.e., 802.11bd standard), in order to enhance 2× throughput, instead of the conventional 10 MHz transmission, a wide bandwidth (20 MHz) transmission is being considered. Additionally, the NGV standard should support operations of interoperability/backward compatibility/coexistence, and so on, with the existing (or conventional) 802.11p standard.

An STA supporting the NGV standard (i.e., NGV STA) may use a midamble for channel estimation. In case a midamble is used for enhanced capability (or performance) of V2X, a solution for efficiently transmitting midamble-related information in a high speed situation may be required. Therefore, the present specification may propose a solution for efficiently transmitting midamble-related information in a high speed situation.

Technical Solutions

According to an example of the present specification, a transmitting station (STA) may configure a Next Generation V2X (NGV) Physical Protocol Data Unit (PPDU).

According to an example of the present specification, the NGV PPDU may include a preamble, a data field that is contiguous to the preamble or a midamble that is contiguous to the data field.

According to an example of the present specification, the preamble may include a legacy signal field, a repeated control field in which the legacy signal field is repeated, or an NGV signal field including control information for interpreting the NGV PPDU.

According to an example of the present specification, the NGV signal field may include information related to a transmission periodicity of the midamble.

According to an example of the present specification, the legacy signal field may be transmitted through a first symbol.

According to an example of the present specification, the repeated control field may be transmitted through a second symbol that is contiguous to the first symbol.

According to an example of the present specification, the NGV signal field may be transmitted through a third symbol that is contiguous to the second symbol.

According to an example of the present specification, a transmitting STA may transmit the NGV PPDU to a receiving STA.

Effects of the Disclosure

The present specification proposes technical features supporting situations where a 5.9 GHz band is used in various types of wireless LAN systems (e.g., IEEE 802.11bd system). Based on various examples of the present specification, throughput enhancement and high speed of Dedicated Short Range Communication (DSRC) (802.11p) may be supported in order to facilitate V2X support at the 5.9 GHz band.

According to an example of the present specification, the present disclosure has an effect of being capable of efficiently transmitting midamble-related information in a high speed situation.

More specifically, according to an example of the present specification, in a WLAN system, a transmitting STA may transmit a midamble. Additionally, the transmitting STA may transmit a transmission cycle of the midamble together with the midamble through an NGV-SIG. Therefore, according to an example of the present specification, the NGV STA may identify in advance the transmission cycle of the midamble.

DESCRIPTION OF EXEMPLARY EMBODIMENTS

Figure 1:
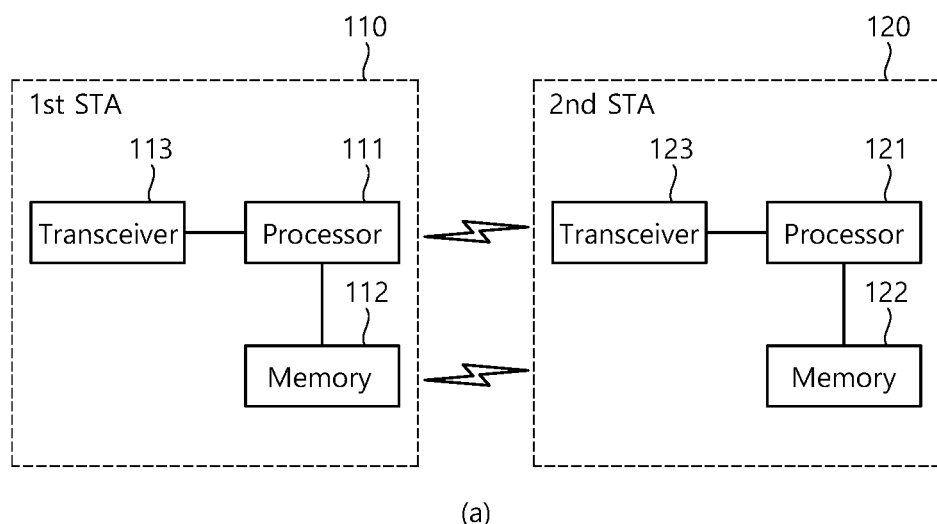
FIG. 1 shows an example of a transmitting apparatus and/or receiving apparatus of the present specification.
Figure 1:
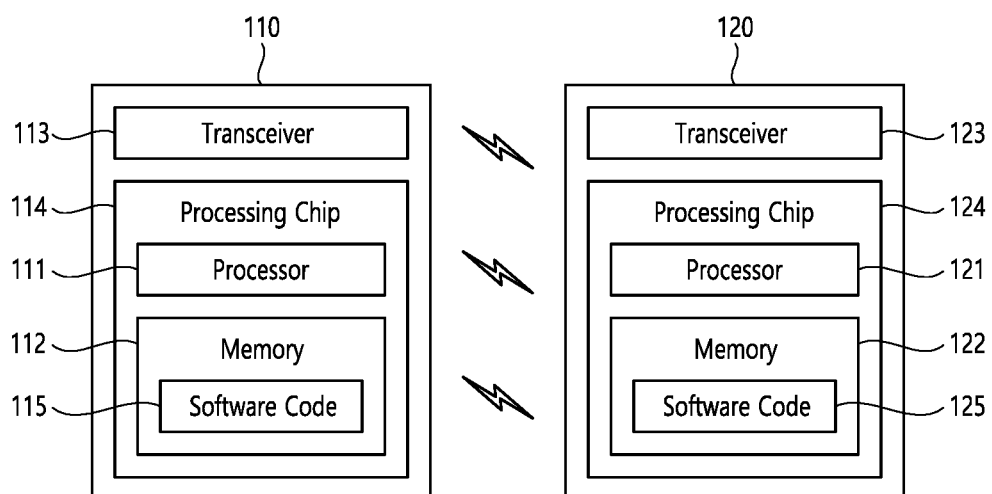

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
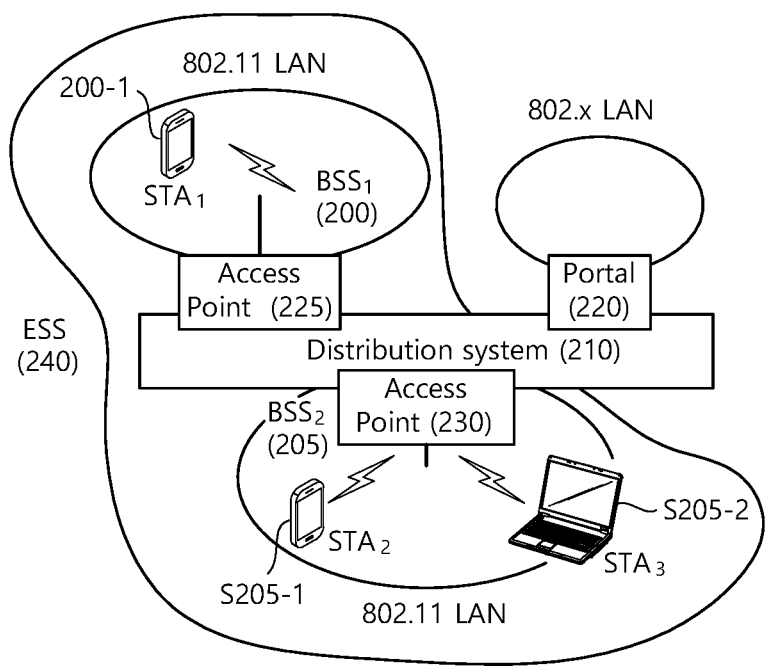
FIG. 2 is a conceptual view illustrating the structure of a wireless local area network (WLAN).
Figure 2:
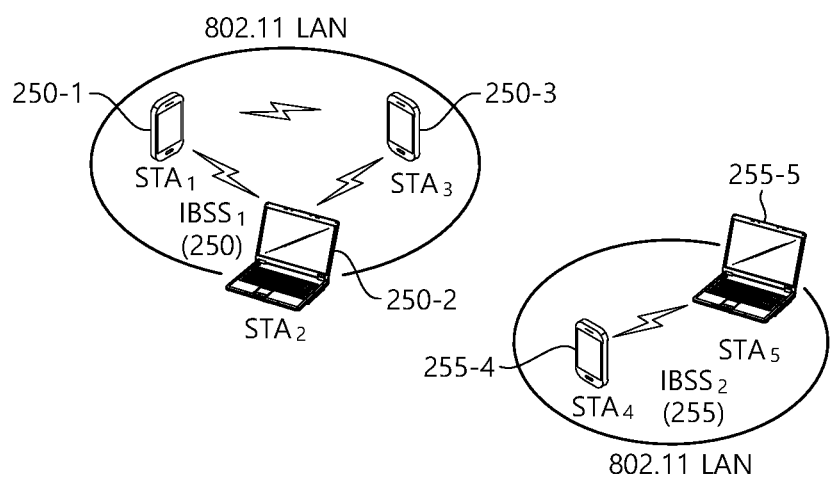

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
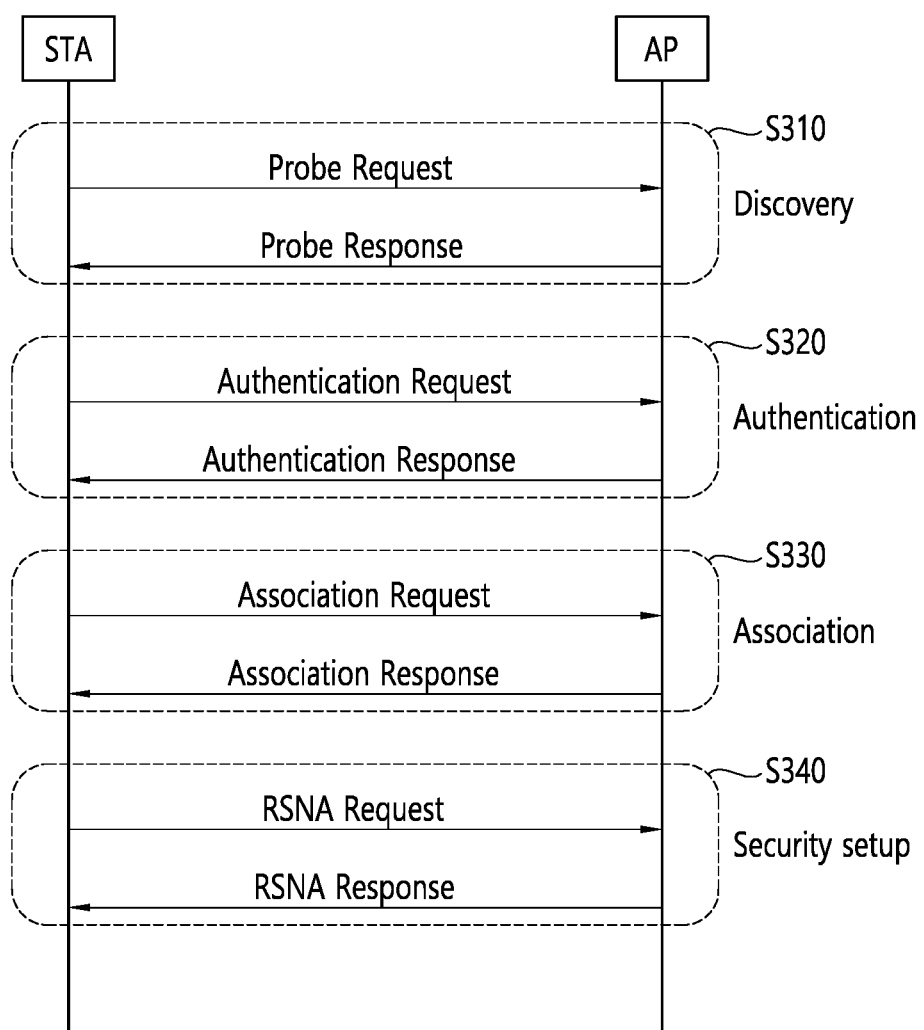
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
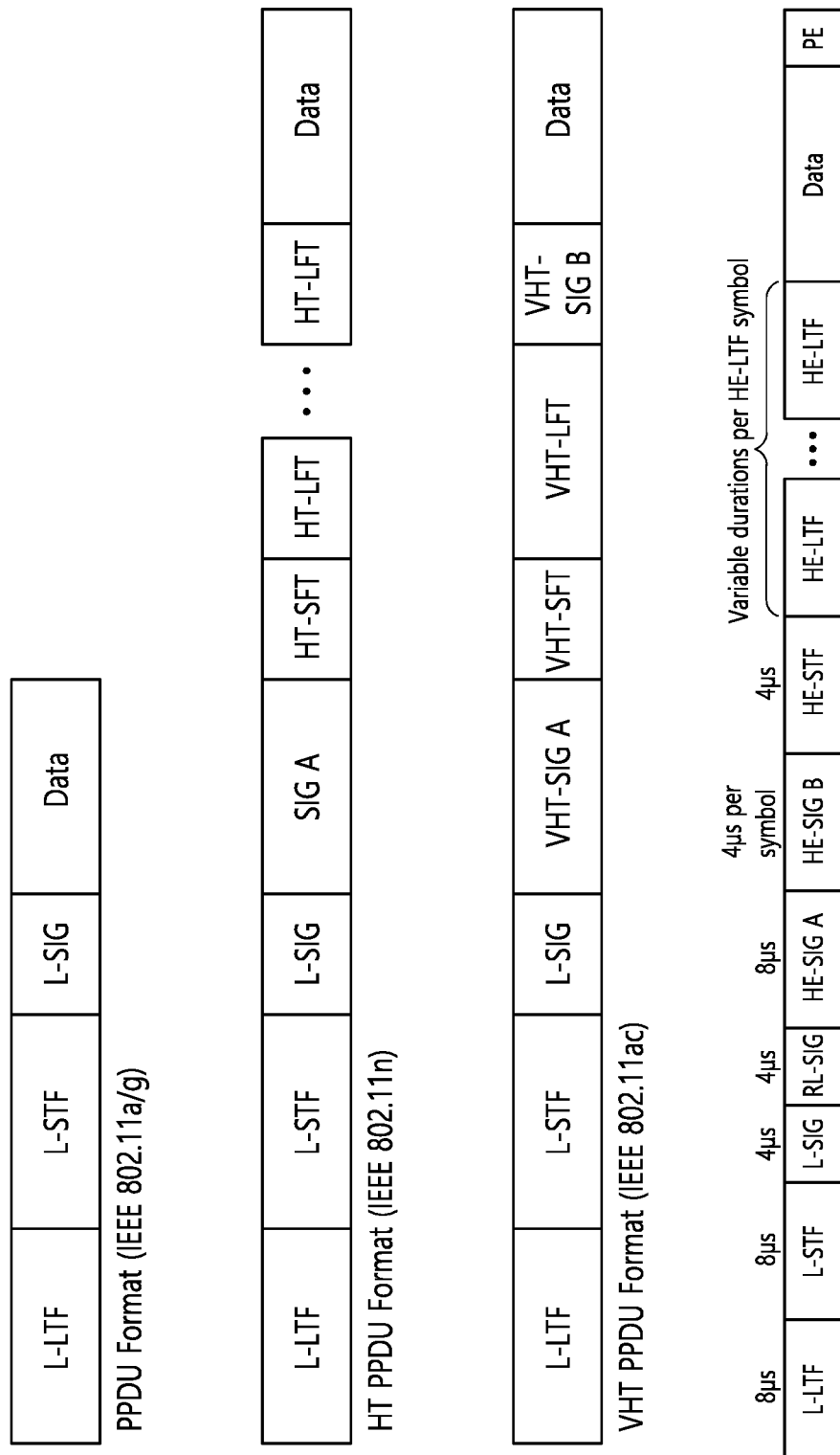
FIG. 4 illustrates an example of a PPDU used in an IEEE standard.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 µs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
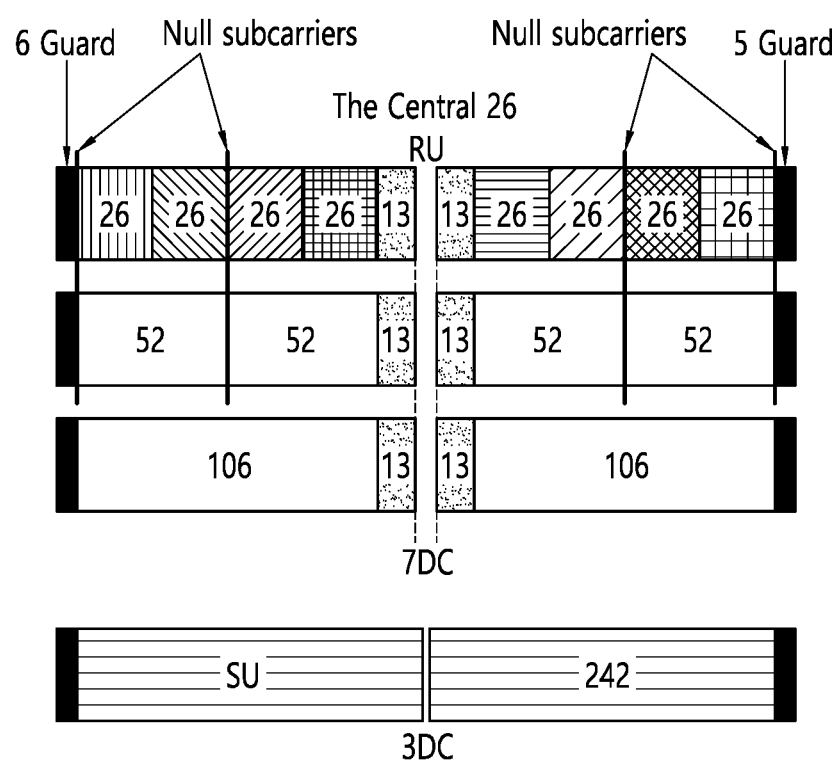
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands.

Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
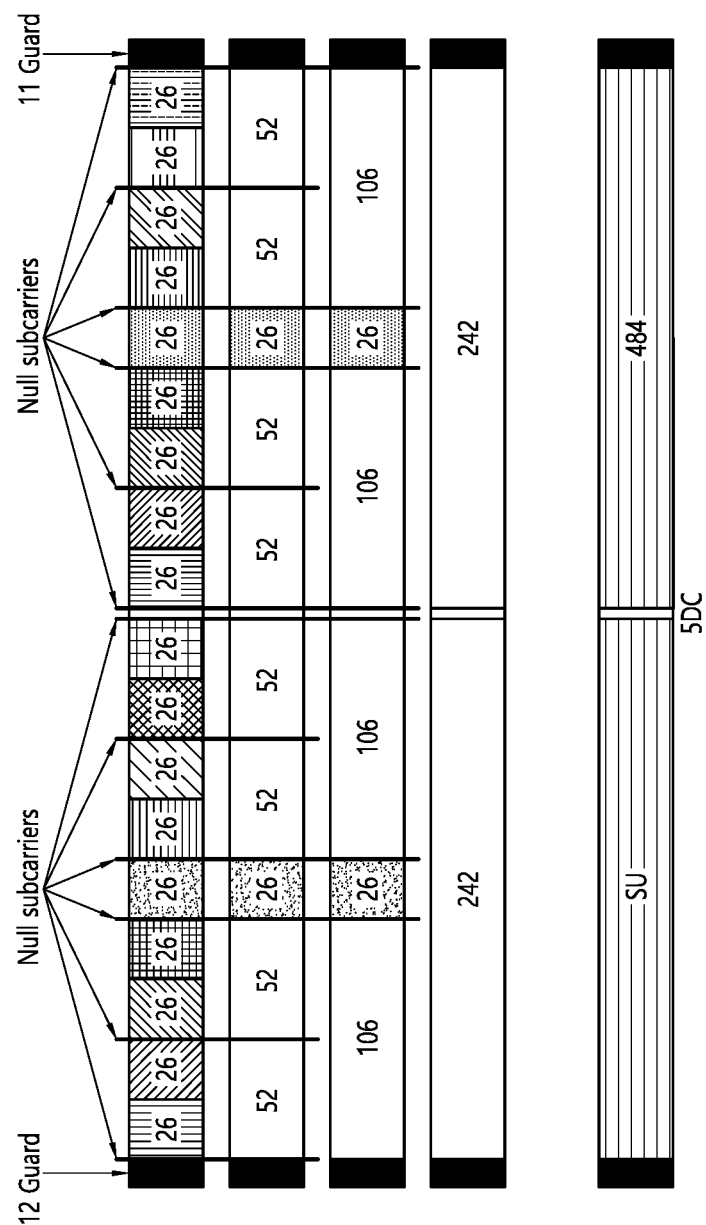
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
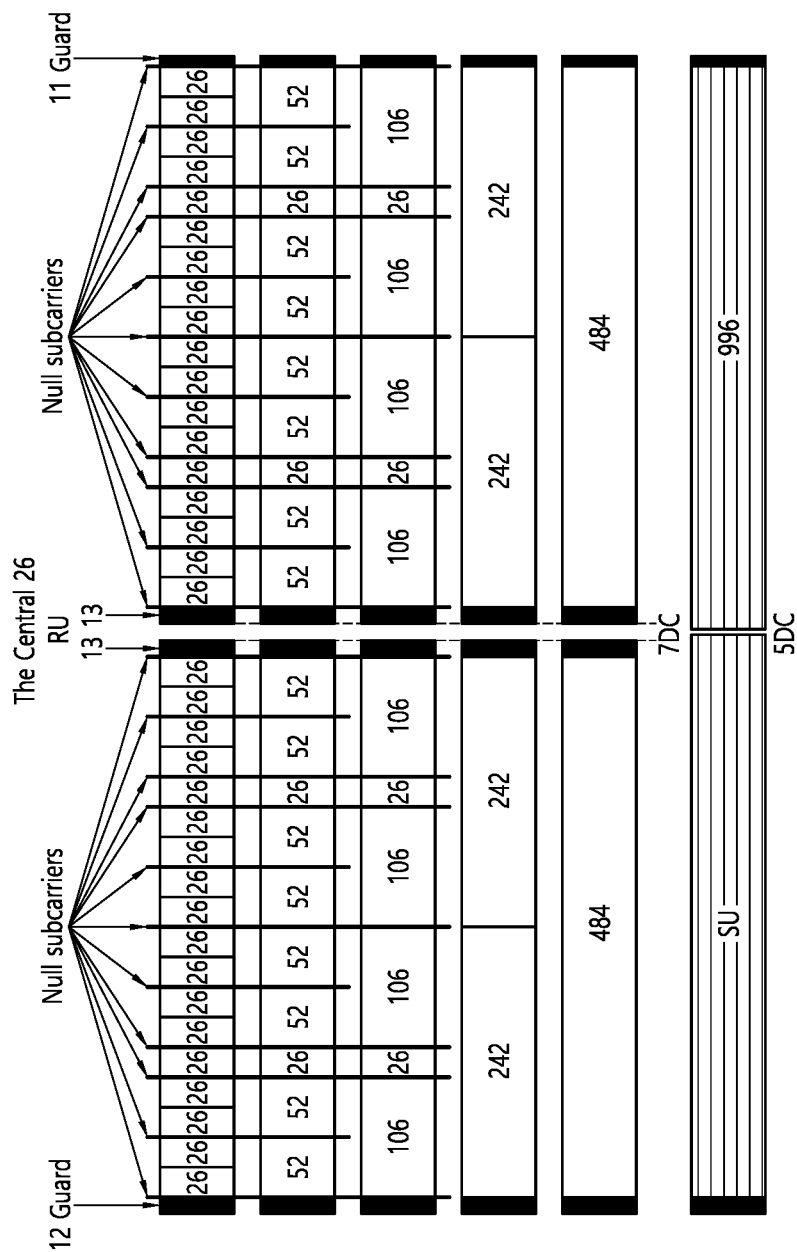
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

In the meantime, the fact that the specific number of RUs can be changed is the same as those of FIGS. 5 and 6.

The RU arrangement (i.e., RU location) shown in FIGS. 5 to 7 can be applied to a new wireless LAN system (e.g. EHT system) as it is. Meanwhile, for the 160 MHz band supported by the new WLAN system, the RU arrangement for 80 MHz (i.e., an example of FIG. 7) may be repeated twice, or the RU arrangement for the 40 MHz (i.e., an example of FIG. 6) may be repeated 4 times. In addition, when the EHT PPDU is configured for the 320 MHz band, the arrangement of the RU for 80 MHz (i.e., an example of FIG. 7) may be repeated 4 times or the arrangement of the RU for 40 MHz (i.e., an example of FIG. 6) may be repeated 8 times.

One RU of the present specification may be allocated for a single STA (e.g., a single non-AP STA). Alternatively, a plurality of RUs may be allocated for one STA (e.g., a non-AP STA).

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
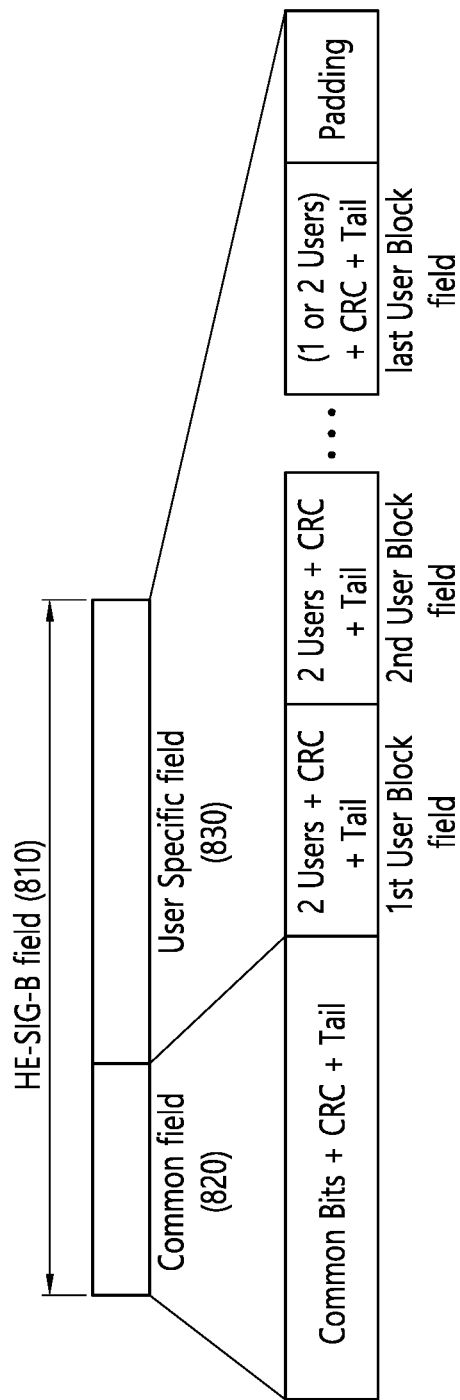
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 |    | 52 | 1 |
| 00000010 | 26 | 26 | 26 | 26 | 26 |    | 52 | 26 | 26 | 1 |
| 00000011 | 26 | 26 | 26 | 26 | 26 |    | 52 |    | 52 | 1 |
| 00000100 | 26 | 26 |    | 52 | 26 | 26 | 26 | 26 | 26 | 1 |
| 00000101 | 26 | 26 |    | 52 | 26 | 26 | 26 |    | 52 | 1 |
| 00000110 | 26 | 26 |    | 52 | 26 |    | 52 | 26 | 26 | 1 |
| 00000111 | 26 | 26 |    | 52 | 26 |    | 52 |    | 52 | 1 |
| 00001000 |    | 52 | 26 | 26 | 26 | 26 | 26 | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ |  |  | 106 |  | 26 | 26 | 26 | 26 | 26 | 8 |
| 01001$y_2y_1y_0$ |  |  | 106 |  | 26 | 26 | 26 |    | 52 | 8 |

"01000$y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information (y2y1y0). For example, when the 3-bit information (y2y1y0) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

Figure 9:
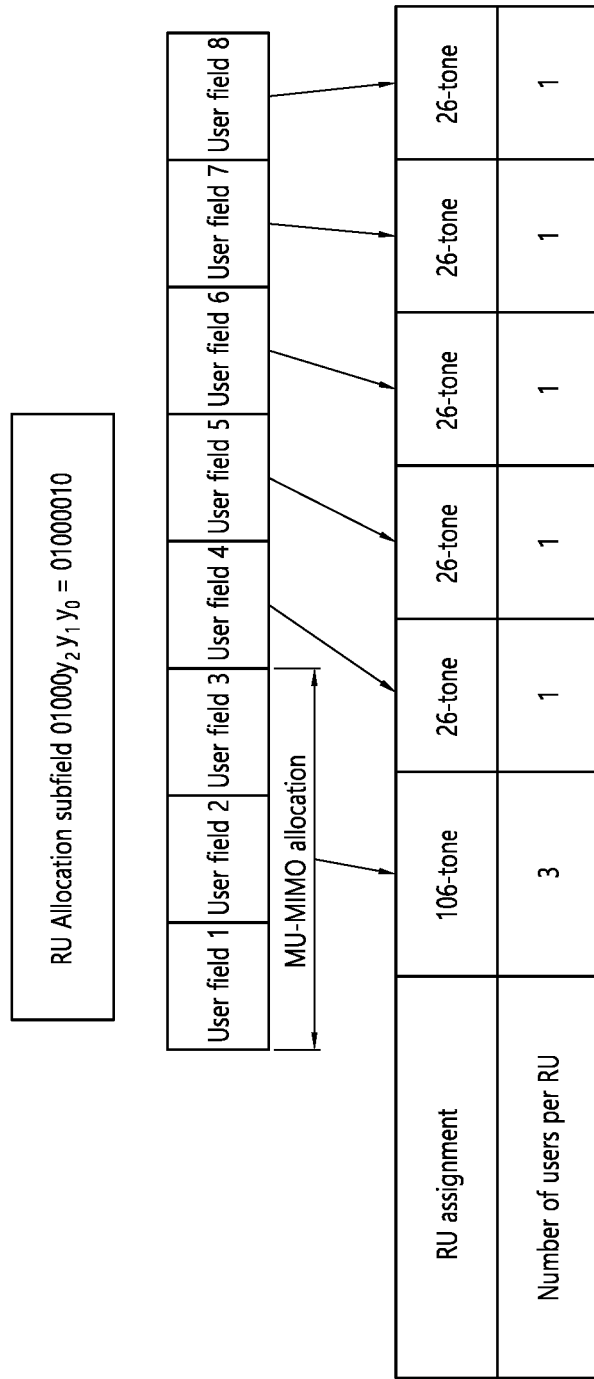
FIG. 9 illustrates an example in which a plurality of user STAs are allocated to the same RU through a MU-MIMO scheme.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration. Specifically, an example of the second bit (i.e., B11-B14) may be as shown in Table 3 and Table 4 below.

TABLE 3

| $N_{user}$ | B3...B0 | $N_{STS}$[1] | $N_{STS}$[2] | $N_{STS}$[3] | $N_{STS}$[4] | $N_{STS}$[5] | $N_{STS}$[6] | $N_{STS}$[7] | $N_{STS}$[8] | Total $N_{STS}$ | Number of entries |
|---|---|---|---|---|---|---|---|---|---|---|---|
| 2 | 0000-0011 | 1-4 | 1 | | | | | | | 2-5 | 10 |
|   | 0100-0110 | 2-4 | 2 | | | | | | | 4-6 | |
|   | 0111-1000 | 3-4 | 3 | | | | | | | 6-7 | |
|   | 1001 | 4 | 4 | | | | | | | 8 | |
| 3 | 0000-0011 | 1-4 | 1 | 1 | | | | | | 3-6 | 13 |
|   | 0100-0110 | 2-4 | 2 | 1 | | | | | | 5-7 | |
|   | 0111-1000 | 3-4 | 3 | 1 | | | | | | 7-8 | |
|   | 1001-1011 | 2-4 | 2 | 2 | | | | | | 6-8 | |
|   | 1100 | 3 | 3 | 2 | | | | | | 8 | |
| 4 | 0000-0011 | 1-4 | 1 | 1 | 1 | | | | | 4-7 | 11 |
|   | 0100-0110 | 2-4 | 2 | 1 | 1 | | | | | 6-8 | |
|   | 0111 | 3 | 3 | 1 | 1 | | | | | 8 | |
|   | 1000-1001 | 2-3 | 2 | 2 | 1 | | | | | 7-8 | |
|   | 1010 | 2 | 2 | 2 | 2 | | | | | 8 | |

TABLE 4

| $N_{user}$ | B3...B0 | $N_{STS}$[1] | $N_{STS}$[2] | $N_{STS}$[3] | $N_{STS}$[4] | $N_{STS}$[5] | $N_{STS}$[6] | $N_{STS}$[7] | $N_{STS}$[8] | Total $N_{STS}$ | Number of entries |
|---|---|---|---|---|---|---|---|---|---|---|---|
| 5 | 0000-0011 | 1-4 | 1 | 1 | 1 | 1 | | | | 5-8 | 7 |
|   | 0100-0101 | 2-3 | 2 | 1 | 1 | 1 | | | | 7-8 | |
|   | 0110 | 2 | 2 | 2 | 1 | 1 | | | | 8 | |
| 6 | 0000-0010 | 1-3 | 1 | 1 | 1 | 1 | 1 | | | 6-8 | 4 |
|   | 0011 | 2 | 2 | 1 | 1 | 1 | 1 | | | 8 | |
| 7 | 0000-0001 | 1-2 | 1 | 1 | 1 | 1 | 1 | 1 | | 7-8 | 2 |
| 8 | 0000 | 1 | 1 | 1 | 1 | 1 | 1 | 1 | 1 | 8 | 1 |

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost As shown in Table 3 and/or Table 4, the second bit (e.g., B11-B14) may include information related to the number of spatial streams allocated to the plurality of user STAs which are allocated based on the MU-MIMO scheme. For example, when three user STAs are allocated to the 106-RU based on the MU-MIMO scheme as shown in FIG. 9, N user is set to "3". Therefore, values of N_STS[1], N_STS[2], and N_STS [3] may be determined as shown in Table 3. For example, when a value of the second bit (B11-B14) is "0011", it may be set to N_STS[1]=4, N_STS[2]=1, N_STS[3]=1. That is, in the example of FIG. 9, four spatial streams may be allocated to the user field 1, one spatial stream may be allocated to the user field 1, and one spatial stream may be allocated to the user field 3.

As shown in the example of Table 3 and/or Table 4, information (i.e., the second bit, B11-B14) related to the number of spatial streams for the user STA may consist of 4 bits. In addition, the information (i.e., the second bit, B11-B14) on the number of spatial streams for the user STA may support up to eight spatial streams. In addition, the information (i.e., the second bit, B11-B14) on the number of spatial streams for the user STA may support up to four spatial streams for one user STA.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., ½, ⅔, ¾, ⅚e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Figure 10:
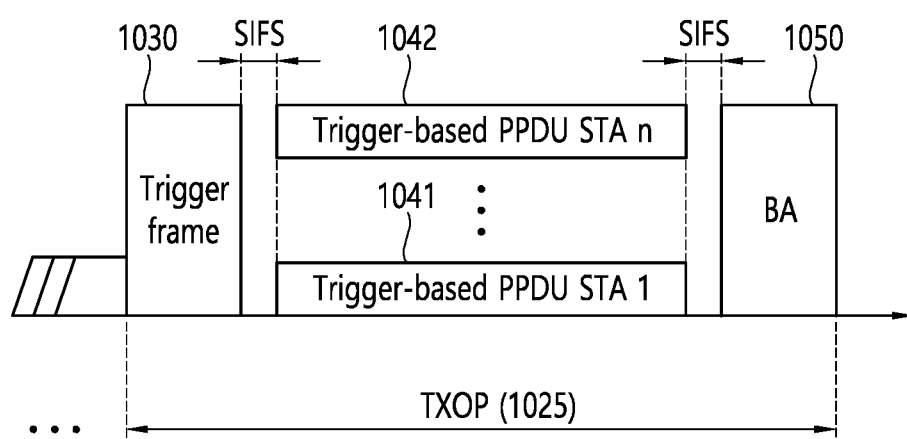
FIG. 10 illustrates an operation based on UL-MU.

FIG. 10 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 11 to FIG. 13. Even if UL-MU communication is used, an orthogonal frequency division multiple access (OFDMA) scheme or a MU MIMO scheme may be used, and the OFDMA and MU-MIMO schemes may be simultaneously used.

Figure 11:
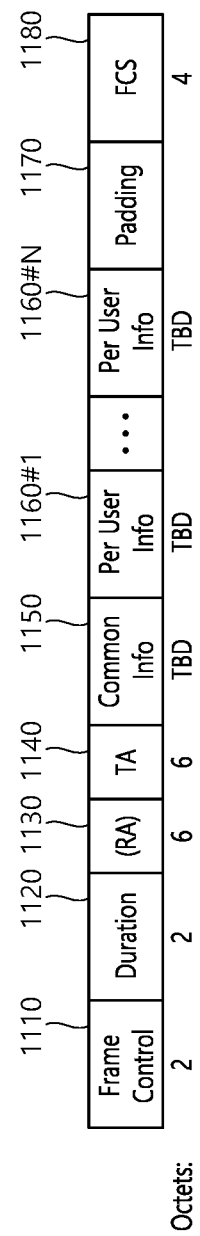
FIG. 11 illustrates an example of a trigger frame.

FIG. 11 illustrates an example of a trigger frame. The trigger frame of FIG. 11 allocates a resource for uplink multiple-user (MU) transmission, and may be transmitted, for example, from an AP. The trigger frame may be configured of a MAC frame, and may be included in a PPDU.

Each field shown in FIG. 11 may be partially omitted, and another field may be added. In addition, a length of each field may be changed to be different from that shown in the figure.

A frame control field 1110 of FIG. 11 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 11 are preferably included. The per user information field may also be called an "allocation field".

In addition, the trigger frame of FIG. 11 may include a padding field 1170 and a frame check sequence field 1180.

Each of the per user information fields 1160 #1 to 1160 #N shown in FIG. 11 may include a plurality of subfields.

Figure 12:
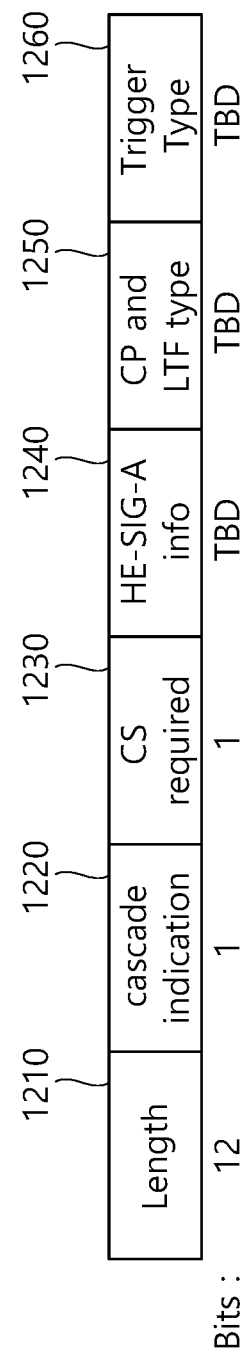
FIG. 12 illustrates an example of a common information field of a trigger frame.

FIG. 12 illustrates an example of a common information field of a trigger frame. A subfield of FIG. 12 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 13:
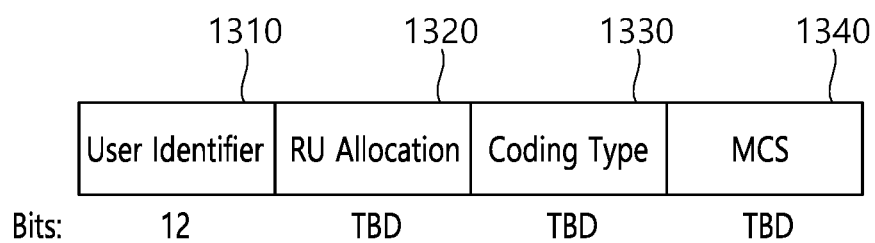
FIG. 13 illustrates an example of a subfield included in a per user information field.

FIG. 13 illustrates an example of a subfield included in a per user information field. A user information field 1300 of FIG. 13 may be understood as any one of the per user information fields 1160 #1 to 1160 #N mentioned above with reference to FIG. 11. A subfield included in the user information field 1300 of FIG. 13 may be partially omitted, and an extra subfield may be added. In addition, a length of each subfield illustrated may be changed.

A user identifier field 1310 of FIG. 13 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320. In this case, the RU indicated by the RU allocation field 1320 may be an RU shown in FIG. 5, FIG. 6, and FIG. 7.

The subfield of FIG. 13 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 13 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 14:
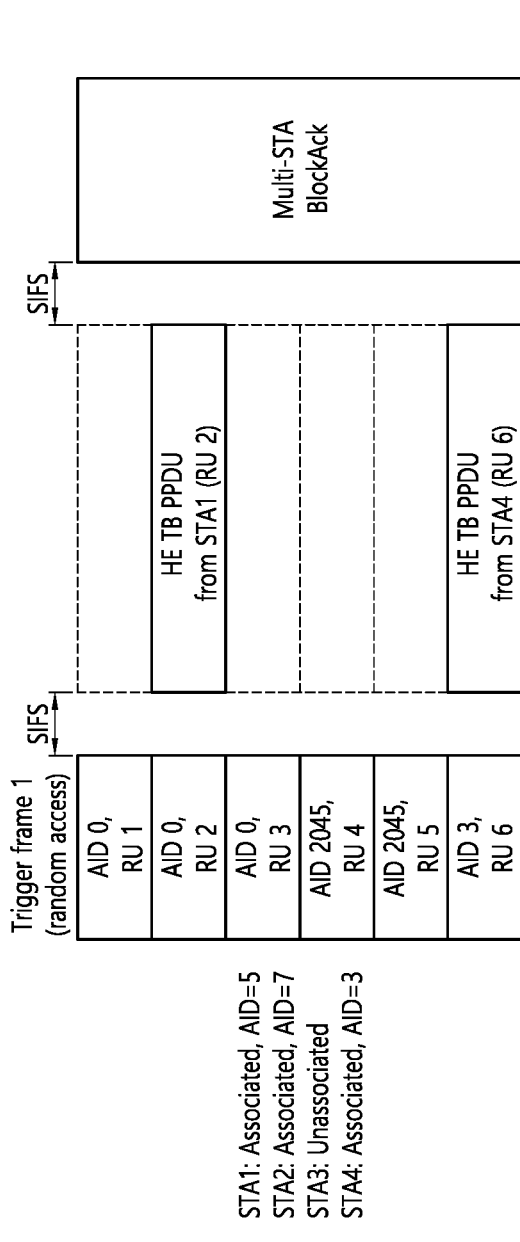
FIG. 14 describes a technical feature of the UORA scheme.

FIG. 14 describes a technical feature of the UORA scheme.

A transmitting STA (e.g., an AP) may allocate six RU resources through a trigger frame as shown in FIG. 14. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 13. Information related to the RU 1 to RU 6 may be included, for example, in the RU allocation field 1320 of FIG. 13. AID=0 may imply a UORA resource for an associated STA, and AID=2045 may imply a UORA resource for an un-associated STA. Accordingly, the 1st to 3rd RU resources of FIG. 14 may be used as a UORA resource for the associated STA, the 4th and 5th RU resources of FIG. 14 may be used as a UORA resource for the un-associated STA, and the 6th RU resource of FIG. 14 may be used as a typical resource for UL MU.

In the example of FIG. 14, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 14, since an AID (e.g., AID=3) of the STA4 is included in a trigger frame, a resource of the RU 6 is allocated without backoff.

Specifically, since the STA1 of FIG. 14 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 14 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 14 is an un-associated STA, the total number of eligible RA RUs for the STA3 is 2 (RU 4, RU 5), and thus the STA3 decreases the OBO counter by 2 but the OBO counter is greater than 0.

Figure 15:
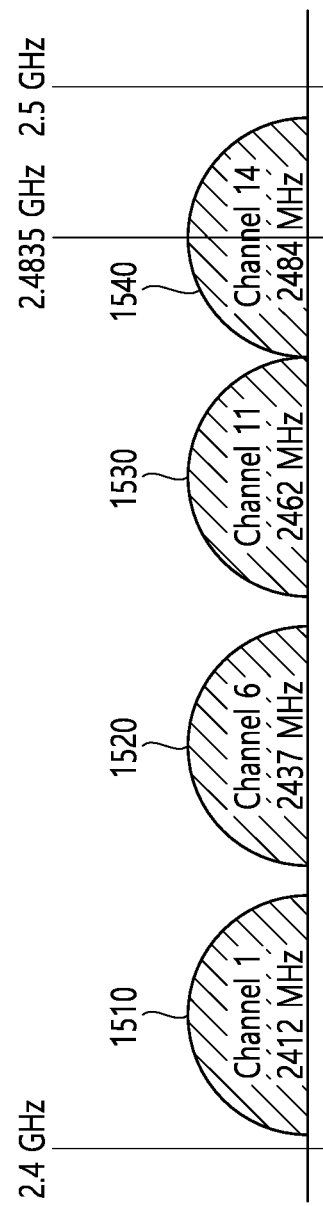
FIG. 15 illustrates an example of a channel used/supported/defined within a 2.4 GHz band.

FIG. 15 illustrates an example of a channel used/supported/defined within a 2.4 GHz band.

The 2.4 GHz band may be called in other terms such as a first band. In addition, the 2.4 GHz band may imply a frequency domain in which channels of which a center frequency is close to 2.4 GHz (e.g., channels of which a center frequency is located within 2.4 to 2.5 GHz) are used/supported/defined.

A plurality of 20 MHz channels may be included in the 2.4 GHz band. 20 MHz within the 2.4 GHz may have a plurality of channel indices (e.g., an index 1 to an index 14). For example, a center frequency of a 20 MHz channel to which a channel index 1 is allocated may be 2.412 GHz, a center frequency of a 20 MHz channel to which a channel index 2 is allocated may be 2.417 GHz, and a center frequency of a 20 MHz channel to which a channel index N is allocated may be (2.407+0.005*N) GHz. The channel index may be called in various terms such as a channel number or the like. Specific numerical values of the channel index and center frequency may be changed.

FIG. 15 exemplifies 4 channels within a 2.4 GHz band. Each of 1st to 4th frequency domains 1510 to 1540 shown herein may include one channel. For example, the 1st frequency domain 1510 may include a channel 1 (a 20 MHz channel having an index 1). In this case, a center frequency of the channel 1 may be set to 2412 MHz. The 2nd frequency domain 1520 may include a channel 6. In this case, a center frequency of the channel 6 may be set to 2437 MHz. The 3rd frequency domain 1530 may include a channel 11. In this case, a center frequency of the channel 11 may be set to 2462

MHz. The 4th frequency domain 1540 may include a channel 14. In this case, a center frequency of the channel 14 may be set to 2484 MHz.

Figure 16:
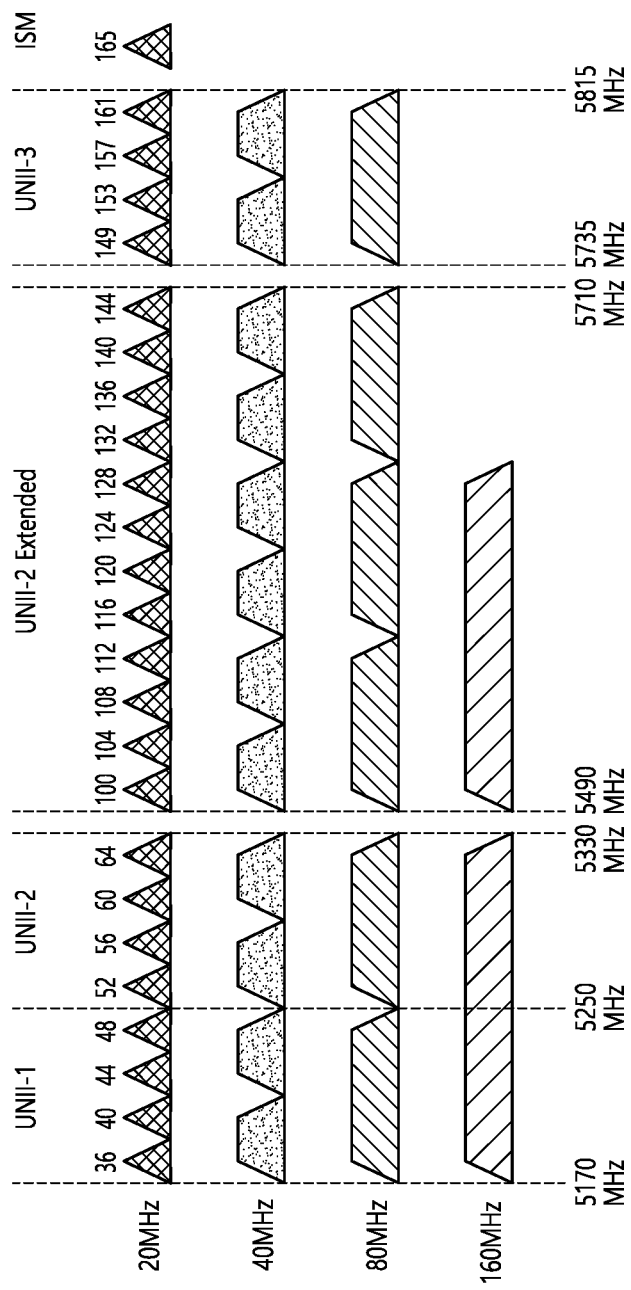
FIG. 16 illustrates an example of a channel used/supported/defined within a 5 GHz band.

FIG. 16 illustrates an example of a channel used/supported/defined within a 5 GHz band.

The 5 GHz band may be called in other terms such as a second band or the like. The 5 GHz band may imply a frequency domain in which channels of which a center frequency is greater than or equal to 5 GHz and less than 6 GHz (or less than 5.9 GHz) are used/supported/defined. Alternatively, the 5 GHz band may include a plurality of channels between 4.5 GHz and 5.5 GHz. A specific numerical value shown in FIG. 16 may be changed.

A plurality of channels within the 5 GHz band include an unlicensed national information infrastructure (UNII)-1, a UNII-2, a UNII-3, and an ISM. The INII-1 may be called UNII Low. The UNII-2 may include a frequency domain called UNII Mid and UNII-2 Extended. The UNII-3 may be called UNII-Upper.

A plurality of channels may be configured within the 5 GHz band, and a bandwidth of each channel may be variously set to, for example, 20 MHz, 40 MHz, 80 MHz, 160 MHz, or the like. For example, 5170 MHz to 5330 MHz frequency domains/ranges within the UNII-1 and UNII-2 may be divided into eight 20 MHz channels. The 5170 MHz to 5330 MHz frequency domains/ranges may be divided into four channels through a 40 MHz frequency domain. The 5170 MHz to 5330 MHz frequency domains/ranges may be divided into two channels through an 80 MHz frequency domain. Alternatively, the 5170 MHz to 5330 MHz frequency domains/ranges may be divided into one channel through a 160 MHz frequency domain.

Figure 17:
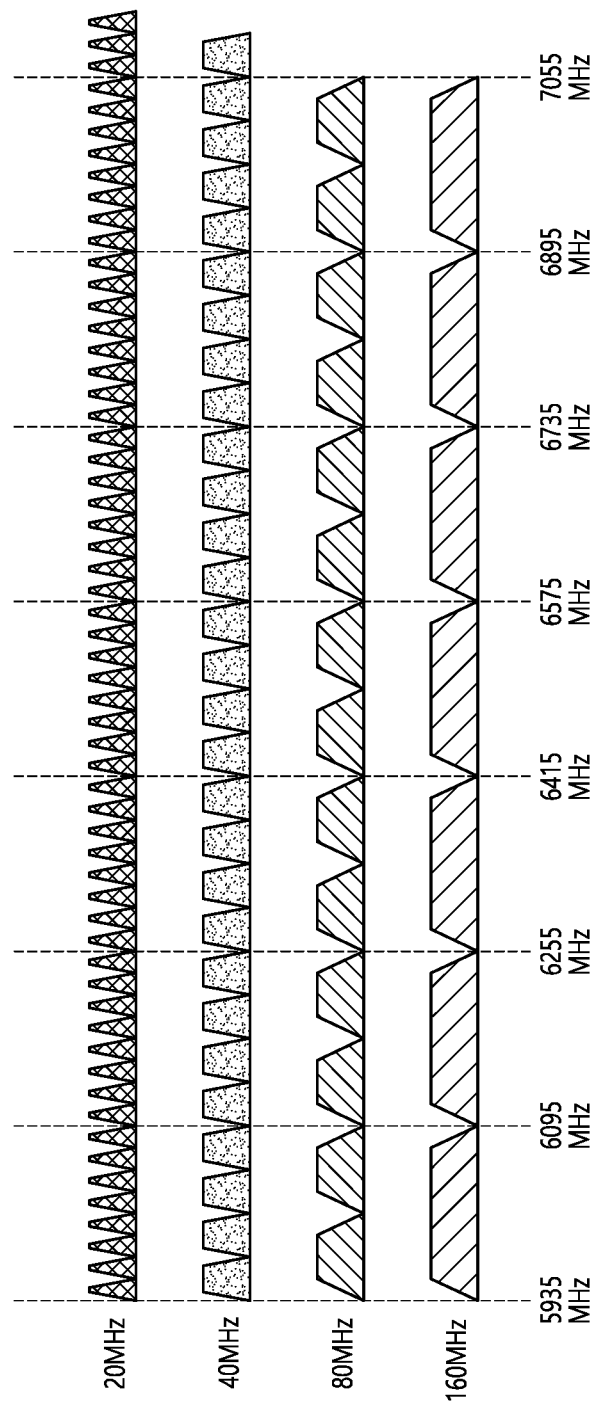
FIG. 17 illustrates an example of a channel used/supported/defined within a 6 GHz band.

FIG. 17 illustrates an example of a channel used/supported/defined within a 6 GHz band.

The 6 GHz band may be called in other terms such as a third band or the like. The 6 GHz band may imply a frequency domain in which channels of which a center frequency is greater than or equal to 5.9 GHz are used/supported/defined. A specific numerical value shown in FIG. 17 may be changed.

For example, the 20 MHz channel of FIG. 17 may be defined starting from 5.940 GHz. Specifically, among 20 MHz channels of FIG. 17, the leftmost channel may have an index 1 (or a channel index, a channel number, etc.), and 5.945 GHz may be assigned as a center frequency. That is, a center frequency of a channel of an index N may be determined as (5.940+0.005*N) GHz.

Accordingly, an index (or channel number) of the 2 MHz channel of FIG. 17 may be 1, 5, 9, 13, 17, 21, 25, 29, 33, 37, 41, 45, 49, 53, 57, 61, 65, 69, 73, 77, 81, 85, 89, 93, 97, 101, 105, 109, 113, 117, 121, 125, 129, 133, 137, 141, 145, 149, 153, 157, 161, 165, 169, 173, 177, 181, 185, 189, 193, 197, 201, 205, 209, 213, 217, 221, 225, 229, 233. In addition, according to the aforementioned (5.940+0.005*N)GHz rule, an index of the 40 MHz channel of FIG. 17 may be 3, 11, 19, 27, 35, 43, 51, 59, 67, 75, 83, 91, 99, 107, 115, 123, 131, 139, 147, 155, 163, 171, 179, 187, 195, 203, 211, 219, 227.

Although 20, 40, 80, and 160 MHz channels are illustrated in the example of FIG. 17, a 240 MHz channel or a 320 MHz channel may be additionally added.

Hereinafter, a PPDU transmitted/received in a STA of the present specification will be described.

Figure 18:
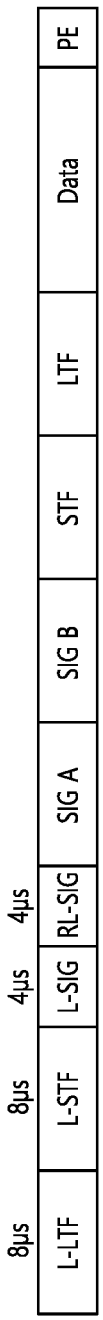
FIG. 18 illustrates an example of a PPDU used in the present specification.

FIG. 18 illustrates an example of a PPDU used in the present specification.

The PPDU 1800 depicted in FIG. 18 may be referred to as various terms such as an EHT PPDU, a TX PPDU, an RX PPDU, a first type or N-th type PPDU, or the like. In addition, the EHT PPDU may be used in an EHT system and/or a new WLAN system enhanced from the EHT system.

The subfields 1801 to 1810 depicted in FIG. 18 may be referred to as various terms. For example, a SIG A field 1805 may be referred to an EHT-SIG-A field, a SIG B field 1806 may be referred to an EHT-SIG-B, a STF field 1807 may be referred to an EHT-STF field, and an LTF field 1808 may be referred to an EHT-LTF.

The subcarrier spacing of the L-LTF, L-STF, L-SIG, and RL-SIG fields 1801, 1802, 1803, and 1804 of FIG. 18 can be set to 312.5 kHz, and the subcarrier spacing of the STF, LTF, and Data fields 1807, 1808, and 1809 of FIG. 18 can be set to 78.125 kHz. That is, the subcarrier index of the L-LTF, L-STF, L-SIG, and RL-SIG fields 1801, 1802, 1803, and 1804 can be expressed in unit of 312.5 kHz, and the subcarrier index of the STF, LTF, and Data fields 1807, 1808, and 1809 can be expressed in unit of 78.125 kHz.

The SIG A and/or SIG B fields of FIG. 18 may include additional fields (e.g., a SIG C field or one control symbol, etc.). The subcarrier spacing of all or part of the SIG A and SIG B fields may be set to 312.5 kHz, and the subcarrier spacing of all or part of newly-defined SIG field(s) may be set to 312.5 kHz. Meanwhile, the subcarrier spacing for a part of the newly-defined SIG field(s) may be set to a pre-defined value (e.g., 312.5 kHz or 78.125 kHz).

In the PPDU of FIG. 18, the L-LTF and the L-STF may be the same as conventional L-LTF and L-STF fields.

The L-SIG field of FIG. 18 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to the number of octets of a corresponding Physical Service Data Unit (PSDU). For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a ½ coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG which is identical to the L-SIG. BPSK modulation may be applied to the RL-SIG. The receiving STA may figure out that the RX PPDU is the HE PPDU or the EHT PPDU, based on the presence of the RL-SIG.

After the RL-SIG of FIG. 18, for example, EHT-SIG-A or one control symbol may be inserted. A symbol contiguous to the RL-SIG (i.e., EHT-SIG-A or one control symbol) may include 26 bit information and may further include information for identifying the type of the EHT PPDU. For example, when the EHT PPDU is classified into various types (e.g., an EHT PPDU supporting an SU mode, an EHT PPDU supporting a MU mode, an EHT PPDU related to the Trigger Frame, an EHT PPDU related to an Extended Range transmission, etc.), Information related to the type of the EHT PPDU may be included in a symbol contiguous to the RL-SIG.

A symbol contiguous to the RL-SIG may include, for example, information related to the length of the TXOP and information related to the BSS color ID. For example, the SIG-A field may be contiguous to the symbol contiguous to the RL-SIG (e.g., one control symbol). Alternatively, a symbol contiguous to the RL-SIG may be the SIG-A field.

For example, the SIG-A field may include 1) a DL/UL indicator, 2) a BSS color field which is an identifier of a BSS, 3) a field including information related to the remaining time of a current TXOP duration, 4) a bandwidth field including information related to the bandwidth, 5) a field including information related to an MCS scheme applied to an HE-SIG B, 6) a field including information related to whether a dual subcarrier modulation (DCM) scheme is applied to the HE-SIG B, 7) a field including information related to the number of symbols used for the HE-SIG B, 8) a field including information related to whether the HE-SIG B is generated over the entire band, 9) a field including information related to the type of the LTF/STF, 10) a field indicating the length of the HE-LTF and a CP length.

The SIG-B of FIG. 18 may include the technical features of HE-SIG-B shown in the example of FIGS. 8 to 9 as it is.

An STF of FIG. 18 may be used to improve automatic gain control estimation in a multiple input multiple output (MIMO) environment or an OFDMA environment. An LTF of FIG. 18 may be used to estimate a channel in the MIMO environment or the OFDMA environment.

The EHT-STF of FIG. 18 may be set in various types. For example, a first type of STF (e.g., 1×STF) may be generated based on a first type STF sequence in which a non-zero coefficient is arranged with an interval of 16 subcarriers. An STF signal generated based on the first type STF sequence may have a period of 0.8 μs, and a periodicity signal of 0.8 μs may be repeated 5 times to become a first type STF having a length of 4 μs. For example, a second type of STF (e.g., 2×STF) may be generated based on a second type STF sequence in which a non-zero coefficient is arranged with an interval of 8 subcarriers. An STF signal generated based on the second type STF sequence may have a period of 1.6 μs, and a periodicity signal of 1.6 μs may be repeated 5 times to become a second type STF having a length of 8 μs. For example, a third type of STF (e.g., 4×STF) may be generated based on a third type STF sequence in which a non-zero coefficient is arranged with an interval of 4 subcarriers. An STF signal generated based on the third type STF sequence may have a period of 3.2 μs, and a periodicity signal of 3.2 μs may be repeated 5 times to become a second type STF having a length of 16 μs. Only some of the first to third type EHT-STF sequences may be used. In addition, the EHT-LTF field may also have first, second, and third types (i.e., 1×, 2×, 4×LTF). For example, the first/second/third type LTF field may be generated based on an LTF sequence in which a non-zero coefficient is arranged with an interval of 4/2/1 subcarriers. The first/second/third type LTF may have a time length of 3.2/6.4/12.8 μs. In addition, Guard Intervals (GIs) with various lengths (e.g., 0.8/1/6/3.2 μs) may be applied to the first/second/third type LTF.

Information related to the type of STF and/or LTF (including information related to GI applied to the LTF) may be included in the SIG A field and/or the SIG B field of FIG. 18.

The PPDU of FIG. 18 may support various bandwidths. For example, the PPDU of FIG. 18 may have a bandwidth of 20/40/80/160/240/320 MHz. For example, at least one field (e.g., STF, LTF, data) of FIG. 18 may be configured based on RUs illustrated in FIGS. 5 to 7, and the like. For example, when there is one receiving STA of the PPDU of FIG. 18, all fields of the PPDU of FIG. 18 may occupy the entire bandwidth. For example, when there are multiple receiving STAs of the PPDU of FIG. 18 (i.e., when MU PPDU is used), some fields (e.g., STF, LTF, data) of FIG. 18 may be configured based on the RUs shown in FIGS. 5 to 7. For example, the STF, LTF, and data fields for the first receiving STA of the PPDU may be transmitted/received through a first RU, and the STF, LTF, and data fields for the second receiving STA of the PPDU may be transmitted/received through a second RU. In this case, the locations/positions of the first and second RUs may be determined based on FIGS. 5 to 7, and the like.

The PPDU of FIG. 18 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "module 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 18. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "module 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/ received based on the PPDU of FIG. 18. The PPDU of FIG. 18 may be used to transmit/receive frames of various types. For example, the PPDU of FIG. 18 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 18 may be used for a management frame. An example of the management frame may include a beacon frame, a (re-)association request frame, a (re-)association response frame, a probe request frame, and a probe response frame. For example, the PPDU of FIG. 18 may be used for a data frame. For example, the PPDU of FIG. 18 may be used to simultaneously transmit at least two or more of the control frame, the management frame, and the data frame.

Figure 19:
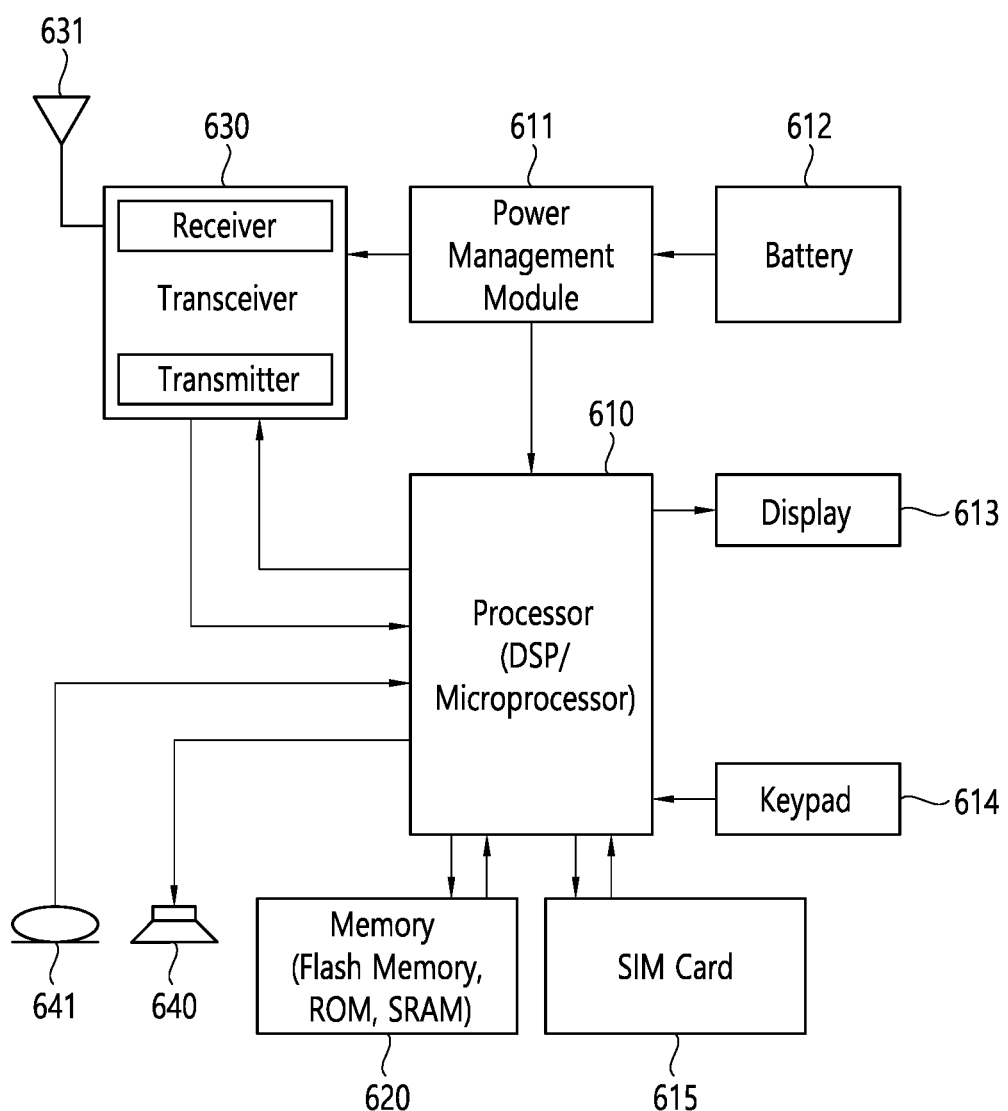
FIG. 19 illustrates an example of a modified transmission device and/or receiving device of the present specification.

FIG. 19 illustrates an example of a modified transmission device and/or receiving device of the present specification.

Each device/STA of the sub-figure (a)/(b) of FIG. 1 may be modified as shown in FIG. 19. A transceiver 630 of FIG. 19 may be identical to the transceivers 113 and 123 of FIG. 1. The transceiver 630 of FIG. 19 may include a receiver and a transmitter.

A processor 610 of FIG. 19 may be identical to the processors 111 and 121 of FIG. 1. Alternatively, the processor 610 of FIG. 19 may be identical to the processing chips 114 and 124 of FIG. 1.

A memory 620 of FIG. 19 may be identical to the memories 112 and 122 of FIG. 1. Alternatively, the memory 620 of FIG. 19 may be a separate external memory different from the memories 112 and 122 of FIG. 1.

Referring to FIG. 19, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 19, a speaker 640 may output a result related to a sound processed by the processor 610. A microphone 641 may receive an input related to a sound to be used by the processor 610.

Figure 20:
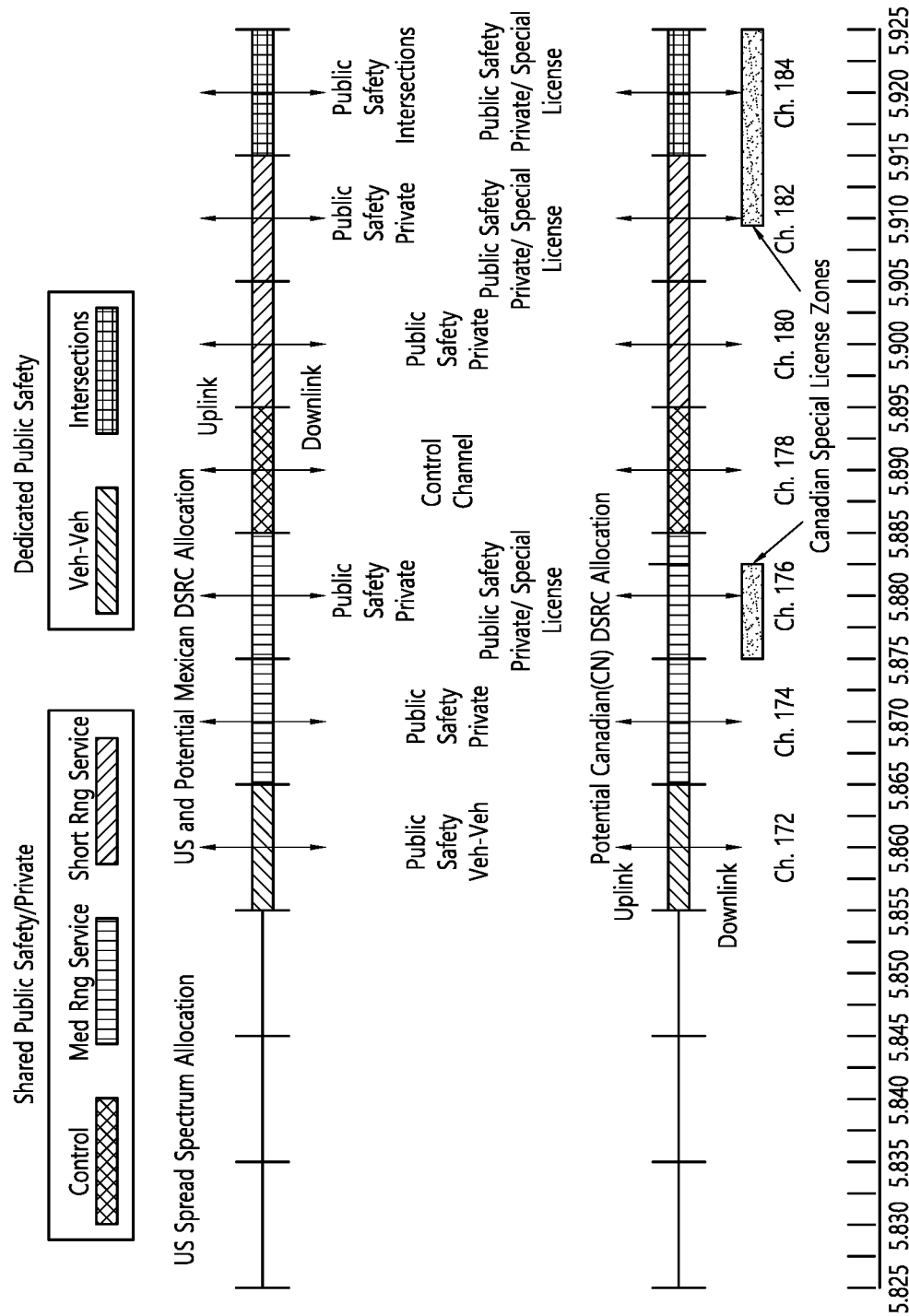
FIG. 20 shows a band plan of 5.9 GHz DSRC.

FIG. 20 shows a band plan of 5.9 GHz DSRC.

5.9 GHz DSRC is a short to medium range communications service that supports both public safety and private operations in roadside-to-vehicle and vehicle-to-vehicle communication environments. DSRC is devised as a complement to cellular communications by providing very high data transfer rates in situations where minimizing latency in the communication link and isolating relatively small communication zones are important. Additionally, PHY and MAC protocols are based on the revision of IEEE 802.11p for wireless access in a vehicular environment (WAVE).

<IEEE 802.11p>

802.11p uses a PHY of 802.11a by performing 2× downclocking on the PHY. That is, 802.11p transmits a signal by using a 10 MHz bandwidth and not a 20 MHz bandwidth. The numerology comparing 802.11a to 802.11p is as follows.

TABLE 5

| | IEEE 802.11a | IEEE 802.11p |
|---|---|---|
| Symbol duration | 4 us | 8 us |
| Guard period | 0.8 us | 1.6 us |
| Subcarrier spacing | 312.5 KHz | 156.25 KHz |
| OFDM subcarrier | 52 | 52 |
| Number of pilot | 4 | 4 |
| Default BW | 20 MHz | 10 MHz |
| Data rate (Mbps) | 6,9,12,18,24,36,48,54 Mbps | 3,4.5,6,9,12,18,24,27 Mbps |
| Frequency band | 5 GHz ISM | 5.9 GHz dedicated |

Channels of a DSRC band include a control channel and a service channel, and each channel is capable of performing data transmission at 3, 4.5, 6, 9, 12, 18, 24, and 27 Mbps. If an option channel (or optional channel) of 20 MHz exists, transmission at 6, 9, 12, 18, 24, 36, 48, and 54 Mbps may be performed. 6, 9, and 12 Mbps should be supported in all services and channels. And, in case of a control channel, although a preamble is 3 Mbps, the message itself is 6 Mbps. In case channels 174 and 176 and channels 180 and 182 are authorized by a frequency regulation organization, the channel sets may be channels 175 and 181 of 20 MHz, respectively. The remaining channel should be reserved for future usage. A short message or notification data, public safety alarm data, and so on, are broadcasted to all On Board Units (OBUs) through the control channel. The control channel and the service channel have been isolated in order to maximize efficiency and quality of service and to reduce interference between services.

Channel number 178 is a control channel, which automatically performs search and receives notification or data transmission, warning messages, and so on, from a Road Side Unit (RSU). All data of the control channel should be transmitted within 200 ms and is repeated at a pre-defined cycle. In a control channel, public safety warnings have the highest priority over any other private messages. Private messages that are larger than 20 Oms are transmitted through a service channel.

Private messages or long public safety messages, and so on, are transmitted through a service channel. In order to prevent collision (or conflict), a scheme for detecting channel status (i.e., Carrier Sense Multiple Access (CSMA)) is used prior to the transmission.

Hereinafter, EDCA parameters in an Outside Context of BSS (OCB) mode will be defined. An OCB mode denotes a state where direct communication between nodes can be performed without any procedure of association with an AP. The following shows a basic EDCA parameter set for STA operations, in case dot11OCBActivated is true.

TABLE 6

| AC | CWmin | CWmax | AIFSN | TXOP limit |
|---|---|---|---|---|
| AC_BK | aCWmin | aCWmax | 9 | 0 |
| AC_BE | aCWmin | aCWmax | 6 | 0 |
| AC_VI | (aCWmin + 1)/2-1 | aCWmin | 3 | 0 |
| AC_VO | (aCWmin + 1)/4-1 | (aCWmin + 1)/2-1 | 2 | 0 |

Characteristics of the OCB mode is as follows.
1. In a MAC header, To/From DS fields may be set to '0'.
2. Fields related to Address Individual or group destination MAC address may be used.

A BSSID field may be the same as a wildcard BSSID. (BSSID field=wildcard BSSID)

In a Data/Management frame, Address 1 may be an RA, Address 2 may be a TA, and Address 3 may be a wildcard BSSID.

3. An authentication process, an association process, or data confidentiality services of the IEEE 802.11 standard may not be used (or utilized).

4. A TXOP limit may be set to '0'.

5. Only a TC (TID) may be used.

6. STAs may not be required to synchronize to a common clock or use such mechanisms.

STAs may maintain a timing synchronization function (TSF) timer for purposes other than synchronization 7. The STA may send Action frames, and, if the STA maintains a TSF Timer, the STA may transmit Timing Advertisement frames.

8. The STA may send control frames excluding subtype PS-Poll, CF-End, and CF-End+CFAck.

9. The STA may send data frames of subtype Data, Null, QoS Data, and QoS Null.

10. An STA having dot11OCBActivated that is equal to true should not join (or participate in) or start a BSS.

Format of 11p PPDU

Figure 21:
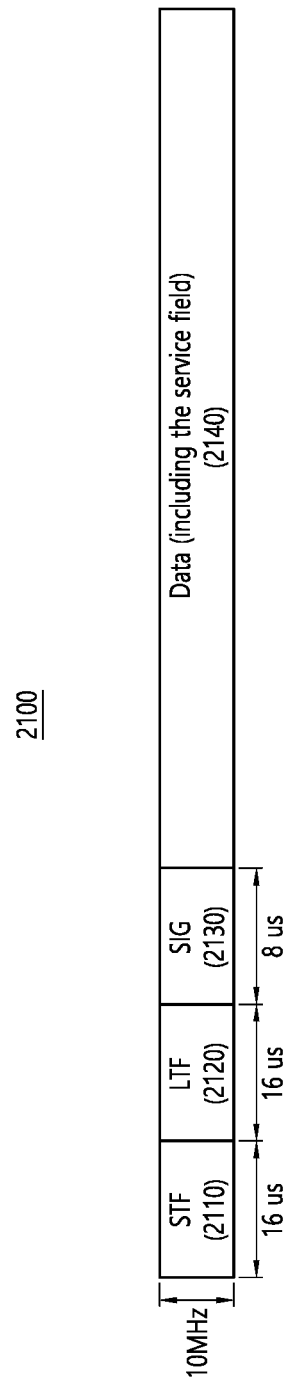
FIG. 21 shows a format of an 11p PPDU.

FIG. 21 shows a format of an 11p PPDU.

Referring to FIG. 21, a frame of the 802.11p standard (hereinafter referred to as 11p PPDU 2100) may support vehicle-to-vehicle (V2V) communication in a 5.9 GHz band. The 11p PPDU 2100 may include an STF 2110 for synchronization (sync) and Automatic Gain Control AGC, an LTF 2120 for channel estimation, and/or a SIG (or SIG field) 2130 including information related to a Data field 2140. The Data field 2140 may be configured to include 16 bits configuring the service field.

The 11p PPDU 2100 may be configured by applying the same OFDM numerology as the IEEE 802.11a standard for a 10 MHz bandwidth. For example, the IEEE 802.11p standard may be applied by 2× down-clocking the OFDM numerology for a 20 MHz bandwidth according to the IEEE 802.11a standard. Therefore, a symbol of the 11p PPDU 2100 may be configured to be longer than a symbol of a frame (or PPDU) of the IEEE 802.11a standard. A symbol of the 11p PPDU 2100 may have a symbol duration of 8 μs. The 11p PPDU 2100 may have a length that is two times longer than a frame according to the 802.11a standard in the aspect of time.

Format of NGV PPDU

Hereinafter, a technical characteristic that can provide interoperability of multiple system will be proposed. For example, multiple systems may include a system (IEEE 802.11bd standard) that is proposed for supporting throughput enhancement, coverage extension, and/or high speed for Vehicle-to-Everything (V2X) in a 5.9 GHz band, and/or a DSRC system that is based on the existing (or conventional) IEEE 802.11p standard.

In order to achieve smooth V2X support in a 5.9 GHz band, a technology for NGV considering throughput enhancement and high-speed support in the DSRC is being developed. FIG. 22 to FIG. 25 show the format of a frame (hereinafter referred to as NGV PPDU) according to the IEEE 802.11bd standard.

An NGV PPDU that will hereinafter be described may include a preamble, a data field that is contiguous to the preamble, and a midamble that is contiguous to the data field. Additionally, the NGV PPDU may include an additional data field that is contiguous to the midamble. A number of symbols or a periodicity (or period or cycle period) of a midamble within an NGV PPDU may be variously configured. For example, the preamble of the NGV PPDU may include an L-STF, an L-LTF, an L-SIG, an RL-SIG, an NGV-SIG, an RNGV-SIG, an NGV-STF, and/or an NGV-LTF. An NGV midamble may be configured to have the same format as the NGV-LTF. The above-mentioned L-SIG, RL-SIG, NGV-SIG, and/or RNGV-SIG may also be referred to as an L-SIG field, an RL-SIG field, an NGV-SIG field, and/or an RNGV-SIG field, respectively.

Figure 22:
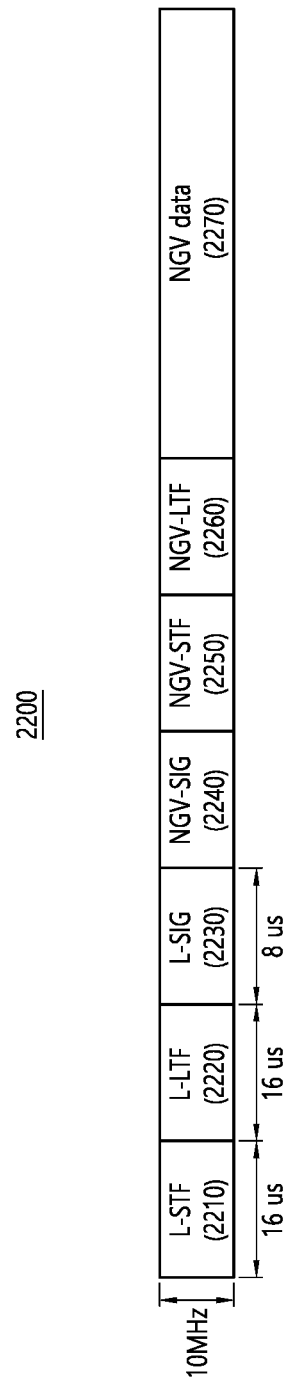
FIG. 22 shows a format of an NGV PPDU.

FIG. 22 shows a format of an NGV PPDU.

Referring to FIG. 22, the IEEE 802.11bd standard may be proposed for throughput enhancement and coverage extension in comparison with the IEEE 802.11p standard. That is, when a PPDU of the IEEE 802.11bd standard (e.g., NGV PPDU 2200) is used, the effects of throughput enhancement and coverage extension are greater than when using a PPDU of the IEEE 802.11p standard (e.g., 11p PPDU 2100 of FIG. 21).

The NGV PPDU 2200 may be configured to have a 10 MHz bandwidth. The NGV PPDU 2200 may include a preamble of an 11p PPDU (i.e., L-STF, L-LTF or L-SIG) for backward compatibility or interoperability with the IEEE 802.11p standard. For example, the NGV PPDU 2200 may include an L-STF 2210, an L-LTF 2220 or an L-SIG 2230. For example, the L-STF 2210, L-LTF 2220 or L-SIG 2230 may be located in a foremost position within the NGV PPDU 2200. In other words, when the L-STF 2210, L-LTF 2220 or L-SIG 2230 are transmitted these fields may be the first to be transmitted/received.

The NGV PPDU 2200 may include an NGV-SIG 2240 including control information related to the NGV standard, a symbol configuring an NGV-STF 2250 or NGV-LTF 2260, and an NGV-data 2270. The NGV-SIG 2240, NGV-STF 2250, NGV-LTF 2260 or NGV-data 2270 may be positioned after the L-SIG 2230.

Unlike what is shown in the drawing, the NGV PPDU 2200 may include various fields. For example, the NGV PPDU 2200 may include one or more of the NGV-SIG 2240, NGV-STF 2250, and NGV-LTF 2260, or may not include at least one of the NGV-SIG 2240, NGV-STF 2250, and NGV-LTF 2260. As another example, the NGV PPDU 2200 may include an RL-SIG having a repeated L-SIG 2230. As yet another example, the NGV PPDU 2200 may include an RNGV-SIG having a repeated NGV-SIG 2240.

The format (or frame format) of the NGV PPDU 2200 shown in FIG. 22 may be an exemplary format. The NGV PPDU 2200 may further include an OFDM symbol after the L-part (i.e., L-STF 2210, L-LTF 2220, and L-SIG 2230) in order to differentiate/classify the NGV frame. An example of an OFDM symbol being further included in the NGV PPDU may be described with reference to FIG. 23.

Figure 23:
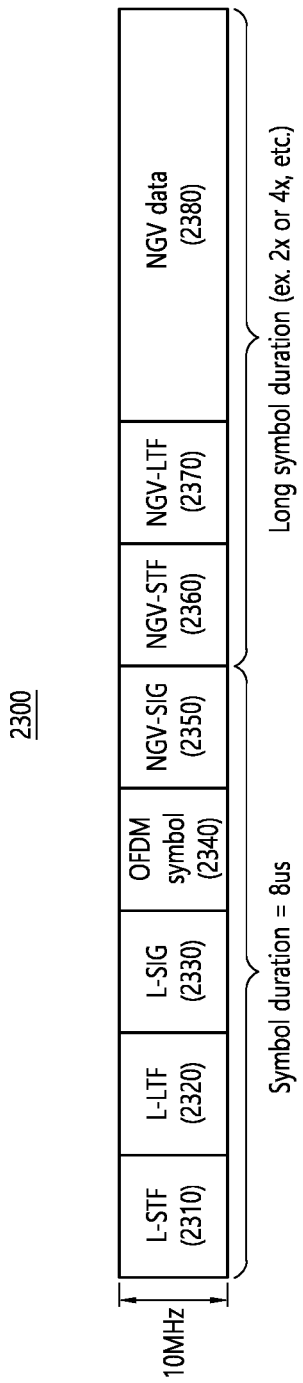
FIG. 23 shows another format of an NGV PPDU.

FIG. 23 shows another format of an NGV PPDU.

Referring to FIG. 23, an NGV PPDU 2300 of the IEEE 802.11bd standard may include an L-STF 2310, an L-LTF 2320, an L-SIG 2330, an OFDM symbol 2340, an NGV-SIG 2350, an NGV-STF 2360, an NGV-LTF 2370, and/or an NGV data 2380.

More specifically, the NGV PPDU 2300 may include an OFDM symbol 2340 for NGV frame format indication or indication of information related to an NGV frame. In other words, when an NGV STA receives an NGV PPDU 2300, the NGV STA may identify, based on the OFDM symbol 2340, that the format of the NGV PPDU 2300 is based on the IEEE 802.11bd standard.

The OFDM symbol 2340 may be positioned in front of an NGV control field (i.e., NGV-SIG 2350, NGV-STF 2360 or NGV-LTF 2370). For example, the OFDM symbol 2340 may include the L-SIG 2330.

A number of symbols in the OFDM symbol 2340 may be variously configured. For example, the number of symbols in the OFDM symbol 2340 may be equal to 1 or more symbols.

Although it is not shown in the drawing, the NGV PPDU 2300 may include an RL-SIG having a repeated L-SIG 2330. For example, the RL-SIG may be contiguous to the L-SIG 2330. The RL-SIG may include the same information field as the L-SIG 2330 and may be modulated by using the same method as the L-SIG 2330 (e.g., BPSK).

According to an embodiment, an NGV part (i.e., NGV-SIG 2350, NGV-STF 2360, NGV-LTF 2370 or NGV data 2380) of the NGV PPDU 2300 may be configured to have a same symbol length as an 11p PPDU. For example, subcarrier spacing of the NGV part may be set to 156.25 kHz. The symbol length of the NGV part may be set to 8 μs.

According to an embodiment, an NGV part of the NGV PPDU 2300 may be configured to have a symbol length that is longer than the symbol length of an 11p PPDU. For example, subcarrier spacing of the NGV part may be set to 78.125 kHz. The symbol length of the NGV part may be set to 16 μs.

Figure 24:
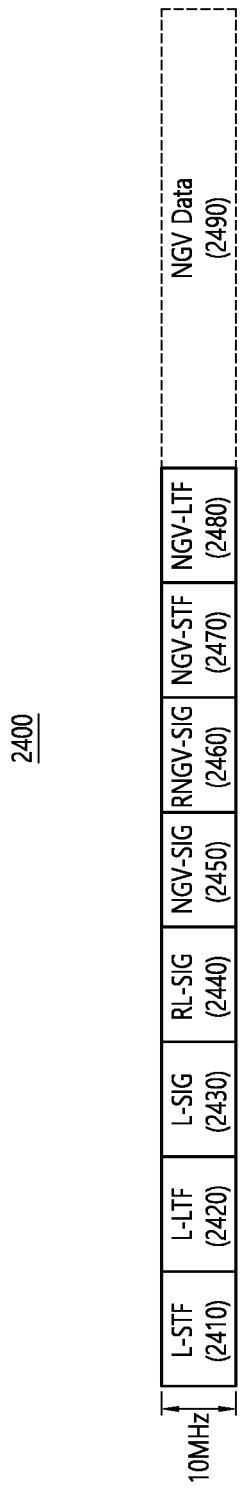
FIG. 24 shows a format of an NGV PPDU for performing 10 MHz transmission.

FIG. 24 shows a format of an NGV PPDU for performing 10 MHz transmission.

Referring to FIG. 24, for backward compatibility or interoperability with the IEEE 802.11p, an NGV PPDU 2400 may include fields (i.e., L-STF, L-LTF and/or L-SIG) of a frame according to the IEEE 802.11p standard (hereinafter referred to as an 11p PPDU). For example, the NGV PPDU 2400 may include an L-STF 2410, an L-LTF 2420 or an L-SIG 2430. Additionally, the NGV PPDU may include an RL-SIG 2440, an NGV-SIG 2450, an RNGV-SIG 2460, an NGV-STF 2470, an NGV-LTF 2480, and/or an NGV Data 2490.

The RL-SIG 2440 may be contiguous to the L-SIG 2430. The RL-SIG 2440 may be a field in which the L-SIG 2430 is repeated. In other words, the RL-SIG 2440 may include the same information field as the L-SIG 2430 and may be modulated by using the same method as the L-SIG 2430 (e.g., BPSK).

The NGV-SIG 2450 may be related to transmission information. For example, the NGV-SIG 2450 may include the transmission information. For example, the NGV-SIG 2450 may be configured to be equal to 24 bits. For example, the NGV-SIG 2450 may include information related to a Physical layer (PHY) Version, information related to a bandwidth, information related to an MCS, information related to a number of spatial streams, information related to a midamble periodicity, information related to an LTF format, information related to an LDPC Extra OFDM Symbol, information related to a CRC, and/or information related to a tail bit. BCC encoding based on a ½ coding rate may be applied to the NGV-SIG 2450.

The RNGV-SIG 2460 may be contiguous to the NGV-SIG 2450. The RNGV-SIG 2460 may be a field in which the NGV-SIG 2450 is repeated. In other words, the RNGV-SIG 2460 may include the same information field as the NGV-SIG 2450 and may be modulated by using the same method as the NGV-SIG 2450 (e.g., BPSK).

The NGV-STF 2470 may be configured by 2× down-clocking a 20 MHz VHT-STF that is configured according to the IEEE 802.11ac standard. The NGV-LTF 2480 may be configured by 2× down-clocking a 20 MHz VHT-LTF that is configured according to the IEEE 802.11ac standard.

The NGV-LTF 2480 may be configured based on at least one LTF format. For example, the NGV-LTF 2480 may be configured based on at least one of an NGV-LTF-1× format, an NGV-LTF-2× format, or a repeated NGV-LTF-2× format. Information related to the LTF format that is used in the NGV-LTF 2480 may be included in the NGV-SIG 2450.

For example, the NGV-LTF-2× format may be set as the default format. As another example, the NGV-LTF-1× format may be used for high-efficiency transmission of one spatial stream. As yet another example, the repeated NGV-LTF-2× format may be used for extended range transmissions. The repeated NGV-LTF-2× format may be configured by repeating the NGV-LTF-2× format from which 1.6 us of one pre-appended cyclic prefix (CP) and guard interval (GI) are excluded. The repeated NGV-LTF-2× format may be used when dual carrier modulation (DCM) and BPSK modulation are applied to the NGV data 2490. For example, when the DCM and BPSK modulation are applied to the NGV data 2490, regardless of the information related to the LTF format included in the NGV-SIG 2450, the repeated NGV-LTF-2× format may be used in/applied to the NGV-LTF 2480.

For example, in the 10 MHz transmission, a sequence of the NGV-LTF-1× format may be configured as shown below in Equation 1.

$$NGV-LTF-1x \text{ sequence} = [1, 0, 1, 0, -1, 0, 1, \\ 0, -1, 0, -1, 0, 1, 0, 1, 0, 1, 0, -1, 0, 1, 0, 1, 0, 1, \\ 0, 1, 0, 0, 0, -1, 0, 1, 0, -1, 0, -1, 0, -1, 0, -1, \\ 0, -1, 0, 1, 0, -1, 0, -1, 0, -1, 0, 1, 0, 1, 0, -1] \quad \text{[Equation 1]}$$

For example, in the 10 MHz transmission, a sequence of the NGV-LTF-2× format may be configured as shown below in Equation 2.

$$NGV-LTF-2x \text{ sequence} = [1, \\ 1, LTF\_left, 0, LTF\_right, -1, -1] \quad \text{[Equation 2]}$$

Referring to Equation 2, LTF left and LTF right may be configured as shown below in Equation 3.

$$LTF\_left = [1, 1, -1, -1, 1, 1, -1, 1, -1, 1, 1, \\ 1, 1, 1, -1, -1, 1, 1, -1, 1, -1, 1, 1, 1, 1] \\ LTF\_right = [1, -1, -1, 1, 1, -1, 1, -1, 1, -1, -1, \\ -1, -1, -1, 1, 1, -1, -1, 1, -1, 1, -1, 1, 1, 1, 1] \quad \text{[Equation 3]}$$

The NGV data 2490 may include a service field, PHY pad bits, and/or a PSDU.

Although it is not shown in the drawing, the NGV PPDU 2400 may include a midamble that is contiguous to the NGV data 2490. Additionally, the NGV PPDU 2400 may include an additional data field that is contiguous to the midamble.

The midamble may be used for performing additional channel estimation. That is, the midamble has an effect of reducing the effect of Doppler shift.

The midamble may be inserted/configured in the NGV PPDU 2400 according to a designated periodicity. Information related to the designated periodicity may be included in the NGV-SIG 2450. For example, the NGV-SIG 2450 may include information related to the midamble periodicity. The midamble periodicity may be set to one of 4, 8 or 16. For example, when the midamble periodicity is set to 4, the NGV PPDU 2400 may include midamble(s) being inserted every 4 data symbols.

The midamble may be configured to have the same format as the NGV-LTF 2480. For example, the midamble may be configured of at least one of an NGV-LTF-1× format, an NGV-LTF-2× format, or a repeated NGV-LTF-2× format. Information related to the LTF format that is used in the midamble may be included in the NGV-SIG 2450.

Figure 25:
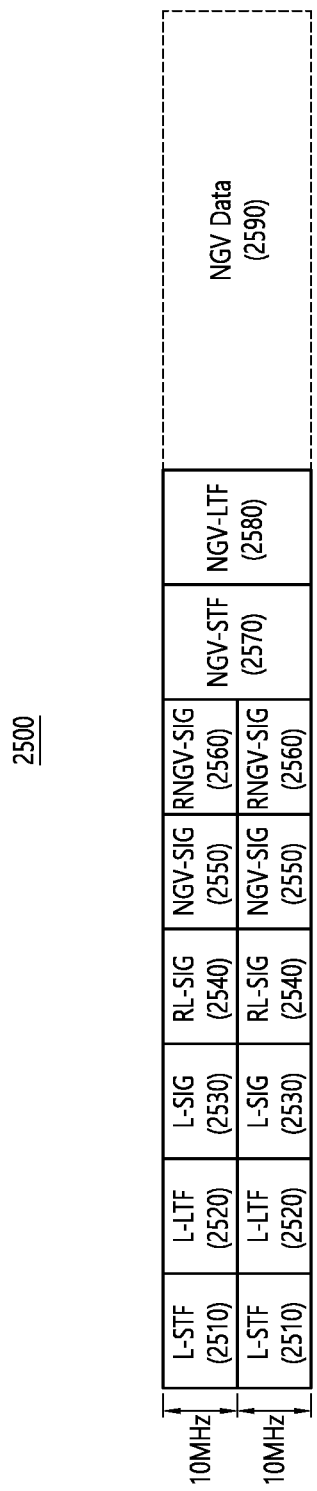
FIG. 25 shows a format of an NGV PPDU for performing 20 MHz transmission.

FIG. 25 shows a format of an NGV PPDU for performing 20 MHz transmission.

Referring to FIG. 25, an NGV PPDU 2500 may be configured of 20 MHz. The NGV PPDU 2500 may include an L-STF 2510, an L-LTF 2520, an L-SIG 2530, an RL-SIG 2540, an NGV-SIG 2550, an RNGV-SIG 2560, an NGV-STF 2570, an NGV-LTF 2580, and/or an NGV Data 2590.

The L-STF 2510, L-LTF 2520 or L-SIG 2530 may be configured by being duplicated in 10 MHz units. The L-STF 2510, L-LTF 2520 or L-SIG 2530 may be related to the L-STF 2410, L-LTF 2420 or L-SIG 2430 of FIG. 24.

According to an embodiment, the RL-SIG 2540, NGV-SIG 2550 or RNGV-SIG 2560 may also be configured by being duplicated in 10 MHz units. The RL-SIG 2540, NGV-SIG 2550 or RNGV-SIG 2560 may be related to the RL-SIG 2440, NGV-SIG 2450 or RNGV-SIG 2460 of FIG. 24, respectively.

The NGV-STF 2570 may be configured by 2× down-clocking a 40 MHz VHT-STF that is configured according to the IEEE 802.11ac standard. The NGV-LTF 2580 may be configured by 2× down-clocking a 40 MHz VHT-LTF that is configured according to the IEEE 802.11ac standard.

The NGV-LTF 2580 may be configured based on at least one LTF format. For example, the NGV-LTF 2580 may be configured based on at least one of an NGV-LTF-1× format, an NGV-LTF-2× format, or a repeated NGV-LTF-2× format.

For example, in the 20 MHz transmission, a sequence of the NGV-LTF-1× format may be configured as shown below in Equation 4.

$$NGV - LTF - 1x \text{ sequence} = [1, 0, -1, 0, 1, 0, -1, 0, -1,$$
$$0, 1, 0, 1, 0, 1, 0, -1, 0, 1, 0, 1, 0, 1, 0, 1, 0, -1,$$
$$0, 1, 0, -1, 0, -1, 0, -1, 0, -1, 0, 1, 0, -1, 0,$$
$$-1, 0, -1, 0, 1, 0, 1, 0, -1, 0, 1, 0, 0, 0, -1, 0, 1, 0,$$
$$1, 0, -1, 0, 1, 0, -1, 0, -1, 0, 1, 0, 1, 0, 1, 0, -1, 0,$$
$$1, 0, 1, 0, 1, 0, 1, 0, 1, 0, -1, 0, 1, 0, -1, 0, -1, 0,$$
$$-1, 0, -1, 0, -1, 0, 1, 0, -1, 0, -1, 0, -1, 0, 1, 0, 1] \quad \text{[Equation 4]}$$

For example, in the 20 MHz transmission, a sequence of the NGV-LTF-2× format may be configured as shown below in Equation 5.

$$NGV - LTF - 2x \text{ sequence} = [\text{LTF\_left}, 1, \text{LTF\_right}, -1, \quad \text{[Equation 5]}$$
$$-1, -1, 1, 0, 0, 0, -1, 1, 1, -1, \text{LTF\_left}, 1, \text{LTE\_right}]$$

Referring to Equation 5, LTF left and LTF right may be configured as presented above in Equation 3.

The NGV data 2590 may include a service field, PHY pad bits, and/or a PSDU. The NGV data 2590 may be related to the NGV data 2490 of FIG. 24.

Although it is not shown in the drawing, similarly to the NGV PPDU 2400 of FIG. 24, the NGV PPDU 2500 may include a midamble that is contiguous to the NGV data 2590. Additionally, the NGV PPDU 2500 may include an additional data field that is contiguous to the midamble.

An example of this specification is related to an NGV PPDU (or 11bd PPDU). The NGV PPDU may be used in various wireless communication systems, and, for example, the NGV PPDU may be used in an IEEE 802.11bd wireless LAN communication system.

The NGV PPDU may be referred to by using various terms. For example, the NGV PPDU may also be referred to as an NGV frame, an 11bd frame, an 11bd PPDU, and so on.

Additionally, as another example, the NGV PPDU may also be referred to by using other various terms, such as a first type PPDU, a transmission PPDU, a reception PPDU, a WLAN PPDU, and so on. Hereinafter, for simplicity in the description, a frame of the IEEE 802.11bd standard may also be referred to as an NGV PPDU. Additionally, a PPDU according to the IEEE 802.11p standard may also be referred to as an 11p PPDU.

Similarly, an STA supporting the IEEE 802.11bd standard may also be referred to by using other various terms. For example, an STA supporting the IEEE 802.11bd standard may also be referred to as an 11bd STA, an NGV STA, a transmitting STA or a receiving STA. Hereinafter, for simplicity in the description, the STA supporting the IEEE 802.11bd standard may be referred to as an NGV STA. Additionally, an STA supporting the IEEE 802.11p standard may be referred to as an 11p STA. Furthermore, the 5.9 GHz band may also be variously referred to as an NGV band, a reception band, a transmission band, and so on.

The development of an NGV standard for throughput enhancement and coverage extension, and so on, in comparison with the IEEE 802.11p standard is currently in process. According to the NGV standard, smooth V2X (or V2X communication) may be supported in a 5.9 GHz band.

An NGV signal (or NGV PPDU) according to the NGV standard may support various modes. That is, an NGV signal may be transmitted in one or more modes. The NGV signal may be transmitted through different formats (or frame formats) based on the aforementioned mode(s). Therefore, an STA that has received an NGV signal should perform packet classification and mode identification (or verification) for the NGV signal. Accordingly, the present specification may hereinafter propose a technical characteristic for performing packet classification and mode indication for an NGV signal.

Midamble Configuration of NGV PPDU

When an NGV STA transmits an NGV PPDU (e.g., NGV PPDU 2400, 2500), in order to reduce the effect of Doppler shift, which is caused by high speed, the NGV STA may periodically transmit a midamble between NGV-data fields. The configuration of a midamble, which is included in an NGV PPDU, may be described in detail with reference to FIG. 26.

Figure 26:
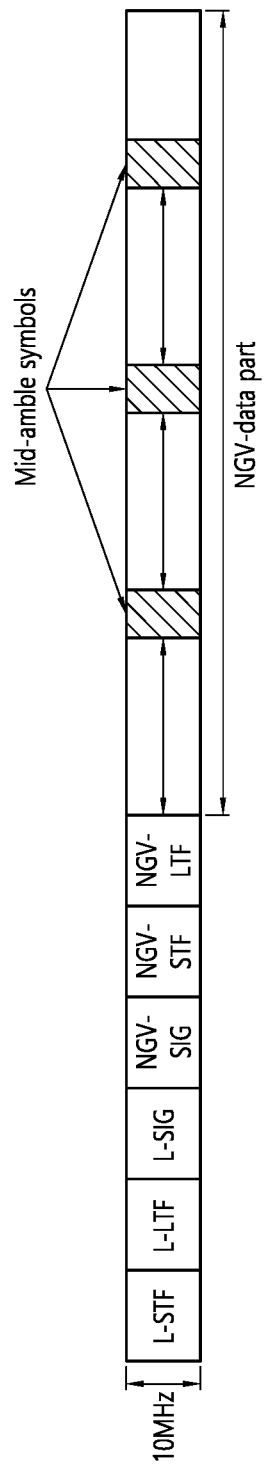
FIG. 26 shows a midamble configuration in an NGV PPDU.

FIG. 26 shows a midamble configuration in an NGV PPDU.

Referring to FIG. 26, an NGV PPDU may include at least one midamble.

According to an embodiment, an NGV PPDU may include a midamble that is contiguous to a data field. The NGV PPDU may include an additional data field that is contiguous to the midamble. For example, the NGV PPDU may include a first midamble that is contiguous to a first data field. The NGV PPDU may include a second data field that is contiguous to the first midamble. And, the NGV PPDU may include a second midamble that is contiguous to the second data field.

According to an embodiment, the midamble may be inserted/configured in-between the NGV-data part according to a designated periodicity (i.e., midamble periodicity). For example, the midamble periodicity may be variously configured. For example, when the midamble periodicity is set to 4, the NGV PPDU may include midamble(s) being inserted every 4 data symbols.

When the above-described midamble is used, information related to the midamble (e.g., information related to a transmission periodicity of the midamble) should be transmitted. Therefore, the present specification may propose a technical characteristic for transmitting information related to the midamble.

Embodiment for Transmitting Information Related to a Midamble

A transmitting STA may configure an NGV PPDU. The NGV PPDU may include a preamble, a data field that is contiguous to the preamble, and/or a midamble that is contiguous to the data field. The NGV PPDU may include an additional data field that is contiguous to the midamble.

The preamble may include a legacy signal field, a repeated control field in which the legacy signal field is repeated, and/or an NGV signal field including control information for interpreting the NGV PPDU. The repeated control field may include a same information field as the legacy signal field, and the repeated control field may be modulated by using a same modulation scheme as the legacy signal field.

The NGV signal field may include information related to a transmission periodicity of the midamble. The transmission periodicity of the midamble may be configured in symbol units of the data field. For example, the transmission periodicity of the midamble may include 4-symbol periodicity, an 8-symbol periodicity, or a 16-symbol periodicity. That is, the midamble periodicity may be configured as one of the 4-symbol periodicity, 8-symbol periodicity, or 16-symbol periodicity.

The information related to a transmission periodicity of the midamble may be configured as 2-bit information. For example, when the information related to a transmission periodicity of the midamble is set to a first value (e.g., '0'), the transmission periodicity of the midamble may be configured of 4 symbols. As another example, when the information related to a transmission periodicity of the midamble is set to a second value (e.g., '1'), the transmission periodicity of the midamble may be configured of 8 symbols. As yet another example, when the information related to a transmission periodicity of the midamble is set to a third value (e.g., '2'), the transmission periodicity of the midamble may be configured of 16 symbols.

A preamble may include at least one first LTF, and a midamble may include at least one second LTF. The at least one first LTF and the at least one second LTF may be configured based on a same LTF sequence. For example, the at least one first LTF and the at least one second LTF may be configured based on one of an NGV-LTF-1× format, an NGV-LTF-2× format, or a repeated NGV-LTF-2× format. Therefore, when the at least one first LTF is configured based on an NGV-LTF-1× format sequence, the at least one second LTF may also configured based on the NGV-LTF-1× format sequence.

A data field may include a PSDU. The data field may further include a 16-bit service field.

A legacy signal field may be transmitted through a first symbol. A repeated control field may be transmitted through a second field, which is contiguous to the first symbol. An NGV signal field may be transmitted through a third symbol, which is contiguous to the second symbol. For example, subcarrier spacing of an NGV PPDU may be set to 156.25 kHz. In this case, each of the first symbol to third symbol may be set to 8 μs.

The transmitting STA may transmit an NGV PPDU, which is configured as described above, to a receiving STA.

Hereinafter, in the present specification, the above-described embodiment may be described in detail based on a detailed example. In the detailed example that will hereinafter be described, the legacy signal field may include an L-SIG. The repeated control field may include an RL-SIG. And, the NGV signal field may include an NGV-SIG.

Detailed Example of an Embodiment for Transmitting Information Related to a Midamble When a midamble is used, information related to symbols (or a number of symbols) used in the midamble and/or information related to a midamble periodicity may be transmitted. Therefore, the present specification may hereinafter propose a technical characteristic of configuring/transmitting the information related to a number of symbols used in the midamble and/or information related to a midamble periodicity.

1. Information Related to a Midamble Symbol

1-A. A midamble may be configured by using an NGV-LTF (or NGV-LTF symbol). A number of symbols that configure a midamble may be determined to be equal to a fixed number. In other words, the number of symbols configuring the midamble may be configured to be equal to a designated value. For example, the number of symbols configuring the midamble may be configured to be equal to 1 symbol or 2 symbols.

1-A-i) When one spatial stream is used, the number of symbols in the midamble may be fixed. In other words, when one spatial stream is used, the number of symbols in the midamble may be configured to be equal to a designated value.

1-A-ii) The number of symbols configuring the midamble (i.e., a number of midamble symbols) may be configured through a capability field. In other words, the capability field may include information related to the number of symbols configuring the midamble.

1-A-iii) Two NGV-LTF symbols may be used as the midamble. In this case, channel estimation may be performed through two symbols. Therefore, this may have an effect of enabling the receiving STA to reduce errors in channel estimation. That is, the receiving STA may gain enhanced receiving performance.

1-B. The number of symbols configuring the midamble that is described above in section 1-A is exemplary, and, therefore, the number of symbols configuring the midamble may be variously configured. When a transmitting STA transmits an NGV PPDU through multiple spatial streams, the number of NGV-LTF symbols being used as the midamble may be determined by a number of spatial streams being transmitted. In other words, the number of symbols configuring the midamble may be configured based on the number of spatial streams.

A number of NGV-LTF symbols that is determined based on a number of spatial streams being transmitted may be configured as shown below in Table 7.

TABLE 7

| Number of Spatials stream | Number of symbol for mid-amble |
| --- | --- |
| 1 | 1 |
| 2 | 2 |
| 3 | 4 |
| 4 | 4 |
| 5 | 6 |
| 6 | 6 |
| 7 | 8 |
| 8 | 8 |

Referring to FIG. 7, based on the number of spatial streams, the number of symbols configuring the midamble (number of midamble symbols) may be configured. For example, when the number of spatial streams is equal to 1, the number of midamble symbols may be set to one symbol. Additionally, when the number of spatial streams is equal to 2, the number of midamble symbols may be set to two symbols.

1-C. The information related to the number of symbols configuring the midamble may be transmitted to the receiving STA through an NGV-SIG. In other words, the NGV-SIG may include the information related to the number of symbols configuring the midamble.

2. Information Related to a Midamble Periodicity

2-A. Information related to a midamble periodicity may be transmitted through various methods. An example of a method for transmitting information related to a midamble periodicity may be described as follows.

2-A-i) The information related to a midamble periodicity may be transmitted through an NGV-SIG. A transmitting STA may instruct (or indicate) the information related to a midamble periodicity by using 1 bit or 2 bits of the NGV-SIG. In other words, the information related to a midamble periodicity may be configured as 1-bit information or 2-bit information of the NGV-SIG.

For example, the information related to a midamble periodicity may be set to various values. For example, the information related to a midamble periodicity may be set to 2/3/4/5/6/8/10/16, and so on.

According to an embodiment, the information related to a midamble periodicity may be configured as 2-bit information of the NGV-SIG. For example, when a value of the 2-bit information is set to a first value (e.g., '0'), the periodicity of the midamble may be set to '4' (or 4 symbols). When a value of the 2-bit information is set to a second value (e.g., '1'), the periodicity of the midamble may be set to '8' (or 8 symbols). And, when a value of the 2-bit information is set to a third value (e.g., '2'), the periodicity of the midamble may be set to '16' (or 16 symbols).

According to an embodiment, considering signaling overhead, two periodicities may be used. The transmitting STA may transmit information related to a midamble periodicity as short (e.g., 2 or 4) and long (e.g., 6 or 8) through 1 bit. For example, when the information related to a midamble periodicity is set to a first value (e.g., '0'), the midamble periodicity may be set to '2' (i.e., short). As another example, when the information related to a midamble periodicity is set to a second value (e.g., '1'), the midamble periodicity may be set to '6' (i.e., long).

As shown in the above-described example, when the information related to a midamble periodicity may be configured as 1-bit information, the signaling overhead may be reduced.

2-A-ii) Unlike in the above-described example, according to a method for transmitting an NGV PPDU, a fixed midamble periodicity may be used. In other words, a midamble periodicity may be configured, based on the method for transmitting an NGV PPDU.

The transmitting STA may use frame format indication or bandwidth (BW) indication in order to indicate (or instruct) information related to a midamble periodicity that is configured based on the method for transmitting an NGV PPDU.

In other words, the transmitting STA may configure first information for indicating a format of the NGV PPDU. The first information may not only indicate the format of the NGV PPDU but may also indicate information related to a midamble periodicity as well. As another example, the transmitting STA may configure second information for indicating a bandwidth of the NGV PPDU. The second information may not only indicate the bandwidth of the NGV PPDU but may also indicate information related to a midamble periodicity as well.

Therefore, hereinafter, an embodiment of transmitting information related to a midamble periodicity through frame format indication and an embodiment of transmitting information related to a midamble periodicity through BW indication may be described one after another.

(1) Embodiment of Transmitting Information Related to a Midamble Periodicity Through Frame Format Indication (1)-A. For example, a frame format or type of the NGV standard may include a frame format or type for gaining high throughput (HT) and a frame format or type for lower sensitivity (LS).

For example, when transmitting an NGV PPDU (or 11bd frame) for HT, a long period (e.g., '8' or '16') may be used in the midamble periodicity. When a long period is used in the midamble periodicity, overhead may be reduced. In other words, when transmitting an NGV PPDU (or 11bd frame) for HT, the midamble periodicity may be configured to as a long periodicity.

For example, when transmitting an NGV PPDU (or 11bd frame) for LS, a short period (e.g., '2' or '4') transmitting a large number of midambles may be used in the midamble periodicity. Additionally, the short period may be used for robust transmission and reliability. Therefore, when a short period is used in the midamble periodicity, the transmission reliability may be increased.

Therefore, by using frame format indication of an NGV PPDU, the transmitting STA may not only transmit information related to the frame format (e.g., format for HT or format for LS) but may also transmit the information related to a midamble periodicity as well.

(1)-A-i) For example, a receiving STA may perform frame format indication through an NGV-SIG (or 11bd-SIG). When HT is indicated (or instructed) through frame format indication, the midamble periodicity may be configured as a long period (e.g., 6 or 8). And, when LS is indicated (or instructed) through frame format indication, the midamble periodicity may be configured as a short period (e.g., 2 or 4). In other words, based on the NGV-SIG, the receiving STA may identify the frame format of the received NGV PPDU. Based on the NGV-SIG, the receiving STA may also identify the midamble periodicity. For example, when the frame format is a frame format for LS, the receiving STA may identify that the midamble periodicity is configured as a short period (e.g., 2 or 4).

(1)-A-ii) The frame format indication may be performed by using various methods. For example, the frame format indication may be performed based on constellation mapping of OFDM symbols. As another example, the frame format indication may be performed based on whether or not the OFDM symbol is being repeated. As yet another example, the frame format indication may be performed based on a signature sequence. As yet another example, the frame format indication may be performed based on content of a specific symbol. And, as yet a further example the frame format indication may be performed based on an extra tone.

Therefore, when the above-described frame format indication is performed, not only the frame format but also the information related to a midamble periodicity may be indicated (or instructed).

(1)-B. The embodiment described in (1)-A may be one example. According to an embodiment, when HT is indicated through the frame format indication, the midamble periodicity may be configured as a short period (e.g., 2 or 4). And, when LS is indicated through the frame format indication, the midamble periodicity may be configured as a long period (e.g., 6 or 8). In this case, the midamble periodicity may be indicated through frame format indication identically as the embodiment described in (1)-A.

(1)-B-i) The receiving STA may identify that the NGV PPDU that is received through frame format indication is configured in a format for HT. At this point, the receiving STA may identify that the midamble periodicity is configured as a short period.

(1)-B-ii) The receiving STA may identify that the NGV PPDU that is received through frame format indication is configured in a format for LS. At this point, the receiving STA may identify that the midamble periodicity is configured as a long period.

(2) Embodiment of Transmitting Information Related to a Midamble Periodicity Through Bandwidth (BW) Indication (2)-A. A transmitting STA may transmit an NGV PPDU by using a bandwidth of 10 MHz or 20 MHz. According to an embodiment, when performing transmission for HT, a bandwidth of 20 MHz may be used. And, when performing transmission for LS, a bandwidth of 10 MHz may be used.

(2)-B. BW indication may be performed based on an NGV-SIG. That is, information related to a bandwidth may be transmitted through an NGV-SIG (or NGV-SIG field). In other words, the NGV-SIG may include information related to a bandwidth. For example, the information related to a bandwidth may be configured as 1-bit information. That is, the transmitting STA may transmit information related to a bandwidth based on the 1-bit information.

For example, when the 1-bit information is set to a first value (e.g., '0'), the bandwidth may be set to 10 MHz. And, when the 1-bit information is set to a second value (e.g., '1'), the bandwidth may be set to 20 MHz. In other words, when the 1-bit information is set to a first value (e.g., '0'), a receiving STA may identify that the bandwidth of the received NGV PPDU is set to 10 MHz. And, when the 1-bit information is set to a second value (e.g., '1'), a receiving STA may identify that the bandwidth of the received NGV PPDU is set to 20 MHz.

Above-described embodiment of indicating/configuring the bandwidth based on a value of the 1-bit information is merely exemplary. And, therefore, unlike the above-described embodiment, the bandwidth may be differently indicated/configured. For example, when the 1-bit information is set to a second value (e.g., '1'), the bandwidth may be set to 10 MHz. And, when the 1-bit information is set to a first value (e.g., '0'), the bandwidth may be set to 20 MHz.

(2)-C. BW indication may be performed by using various methods other than the method of performing BW indication based on the NGV-SIG. For example, the BW indication may be performed based on constellation mapping of OFDM symbols. As another example, the BW indication may be performed based on whether or not the OFDM symbol is being repeated. As yet another example, the BW indication may be performed based on a signature sequence. As yet another example, the BW indication may be performed based on content of a specific symbol. And, as yet a further example the BW indication may be performed based on an extra tone.

(2)-D. Therefore, the midamble periodicity may be variously configured based on the information related to a bandwidth.

(2)-D-i) Based on the information related to a bandwidth, the midamble periodicity may be configured as described below.

(2)-D-i)-a For example, the transmission of an NGV PPDU of a 10 MHz bandwidth may be used for LS. In this case, the midamble periodicity may be configured as a short period. When an NGV PPDU of a 10 MHz bandwidth is transmitted, in case the midamble periodicity is configured as a short period, the reliability may be increased.

(2)-D-i)-b For example, the transmission of an NGV PPDU of a 20 MHz bandwidth may be used for HT. In this case, the midamble periodicity may be configured as a long period. When an NGV PPDU of a 20 MHz bandwidth is transmitted, in case the midamble periodicity is configured as a long period, the overhead may be reduced.

(2)-D-i)-c As an example of the above-described embodiment ((2)-D-i)-a,b), the information related to a bandwidth may be transmitted through a signal field (e.g., L-SIG, RL-SIG, NGV-SIG, or RNGV-SIG). The signal field may include a BW field including the information related to a bandwidth.

For example, when a value of the BW field is set to a first value (e.g., '0'), the bandwidth of the NGV PPDU may be indicated as 10 MHz, and the midamble periodicity of the NGV PPDU may be indicated as a long period. And, when a value of the BW field is set to a second value (e.g., '1'), the bandwidth of the NGV PPDU may be indicated as 20 MHz, and the midamble periodicity of the NGV PPDU may be indicated as a short period.

In other words, based on the value of the BW field, the receiving STA may obtain/identify the information related to a bandwidth and information related to a midamble periodicity of the NGV PPDU.

Based on the value of the BW field being set to a first value (e.g., '0'), the receiving STA may identify that the bandwidth of the NGV PPDU is 10 MHz. Additionally, based on the value of the BW field being set to a first value (e.g., '0'), the receiving STA may identify that the midamble periodicity is configured as a long period.

And, based on the value of the BW field being set to a second value (e.g., '1'), the receiving STA may identify that the bandwidth of the NGV PPDU is 20 MHz. Additionally, based on the value of the BW field being set to a second value (e.g., '1'), the receiving STA may identify that the midamble periodicity is configured as a short period.

(2)-D-i)-d BW indication may be performed based on the embodiment of the above-described section (2)-C. When the bandwidth is indicated as 10 MHz through the BW indication, it may also be indicated that the midamble periodicity is configured as a long period. And, when the bandwidth is indicated as 20 MHz through the BW indication, it may also be indicated that the midamble periodicity is configured as a short period.

(2)-D-ii) As described above, based on the information related to a bandwidth, the embodiment of configuring the midamble periodicity is exemplary. Based on the information related to a bandwidth, the midamble periodicity may be variously configured. For example, the midamble periodicity may be configured to be opposite to the example of (2)-D-i). When the bandwidth is indicated as 10 MHz through the BW indication, it may also be indicated that the midamble periodicity is configured as a short period. And, when the bandwidth is indicated as 20 MHz through the BW indication, it may also be indicated that the midamble periodicity is configured as a long period.

(3) Embodiment of Transmitting Information Related to a Midamble Periodicity Through MCS Indication According to an embodiment, information related to a midamble periodicity may be determined based on MCS. That is, the midamble periodicity may be configured based on the MCS. The MCS may be configured based on a channel situation and transmission method.

For example, based on an MCS index, a fixed midamble periodicity may be used. For example, a fixed midamble periodicity may be used for each MCS index. Based on an MCS index, when a fixed midamble periodicity is used, the midamble periodicity does not need to be indicated separately. Therefore, signaling overhead may be reduced.

Since the fixed midamble periodicity is used for each MCS index, the receiving STA may obtain/identify the midamble periodicity based on the MCS index.

For example, the MCS index may be variously configured. As an example of the MCS index, the NGV-MCS index may be configured as shown below in Table 8.

TABLE 8

| NGV-MCS Index | Modulation | R | $N_{BPSCS}$ | $N_{SD}$ | $N_{CBPS}$ | $N_{DBPS}$ | Data rate (Mb/s) 1.6 µs GI NGV-LTF-2x |
|---|---|---|---|---|---|---|---|
| 0 | BPSK | ½ | 1 | 52 | 52 | 26 | 3.3 |
| 1 | QPSK | ½ | 2 | 52 | 104 | 52 | 6.5 |
| 2 | QPSK | ¾ | 2 | 52 | 104 | 78 | 9.8 |
| 3 | 16QAM | ½ | 4 | 52 | 208 | 104 | 13.0 |
| 4 | 16QAM | ¾ | 4 | 52 | 208 | 156 | 19.5 |
| 5 | 64QAM | ⅔ | 6 | 52 | 312 | 208 | 26.0 |
| 6 | 64QAM | ¾ | 6 | 52 | 312 | 234 | 29.3 |
| 7 | 64QAM | ⅚ | 6 | 52 | 312 | 260 | 32.5 |
| 8 | 256QAM | ¾ | 8 | 52 | 416 | 312 | 39.0 |
| 9 | | | | Not valid | | | |
| 10 | BPSK with DCM | ½ | 1 | 26 | 26 | 13 | 1.6 |

Referring to Table 8, a modulation scheme may be configured based on the NGV-MCS index. For example, when the NGV-MCS index is set to 4 or less (i.e., 1 to 4), the modulation scheme may be set to 16QAM or lower (e.g., 16QAM, QPSK or BPSK). And, when the NGV-MCS index is set to 5 or more (i.e., 5 to 8), the modulation scheme may be set to 64QAM or higher (e.g., 64QAM, 256QAM). The above-described NGV-MCS index may not include information related to an encoding scheme (e.g., BCC encoding or LDPC encoding). Information related to the encoding scheme may be indicated through a field (or information) other than the NGV-MCS index.

Therefore, based on the above-described the MCS index, the midamble periodicity may be variously configured. For example, when the MCS index is set to 4 or less (i.e., modulation of 16QAM or lower), the midamble periodicity may be configured as a long period (e.g., 8 or 10). And, when the MCS index is set to 5 or more (i.e., modulation of 64QAM or higher), the midamble periodicity may be configured as a short period (e.g., 4 or 2). The above-described midamble periodicity is merely exemplary, and, therefore, the midamble periodicity may be variously configured. For example, the MCS index may be set to each of the fixed single midamble periodicity.

Therefore, by using one fixed midamble periodicity for each MCS index, the transmitting/receiving STA may use a midamble best-fitting a V2V channel situation. Accordingly, the performance of the transmitting/receiving STA may be enhanced.

Figure 27:
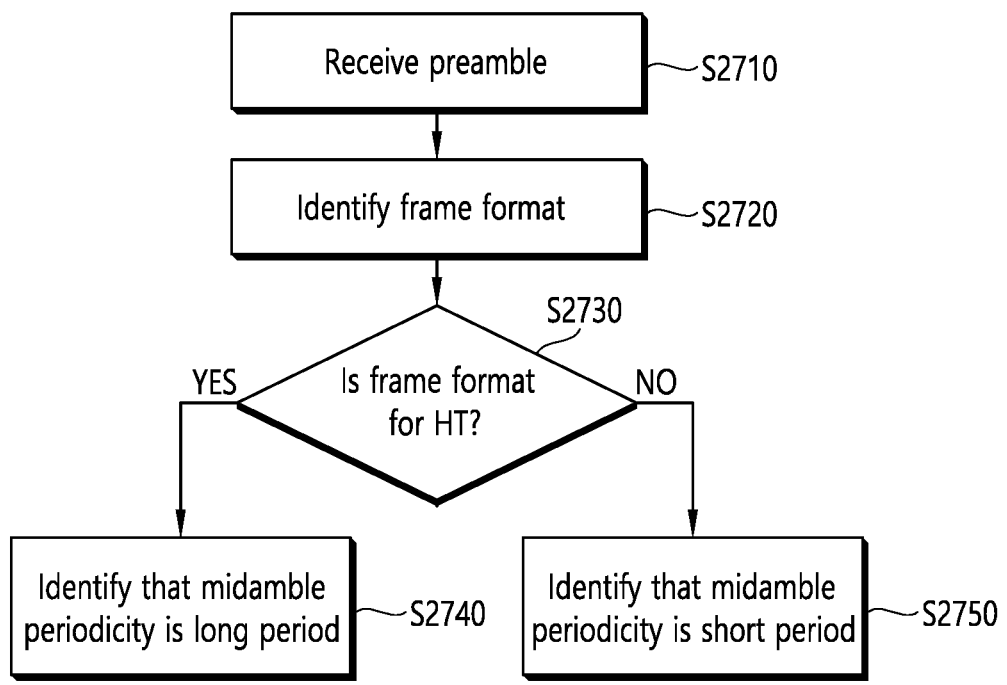
FIG. 27 is a flowchart for describing an operation of a receiving STA.

FIG. 27 is a flowchart for describing an operation of a receiving STA.

Referring to FIG. 27, in step S2710, the receiving STA may receive a preamble. According to an embodiment, the receiving STA may receive an NGV PPDU. More specifically, the receiving STA may receive a preamble of the NGV PPDU. For example, the preamble may include various fields. For example, the preamble may include L-STF, L-LTF, L-SIG, RL-SIG, NGV-SIG, RNGV-SIG, NGV-STF, and/or NGV-LTF.

In step S2720, the receiving STA may identify the frame format. According to an embodiment, the receiving STA may identify the frame format of the NGV PPDU based on the preamble of the received NGV PPDU.

For example, the receiving STA may identify the frame format of the NGV PPDU based on an NGV-SIG of the NGV PPDU. The NGV-SIG may include information related to the frame format of the NGV PPDU. Based on the information related to the frame format of the NGV PPDU, the receiving STA may determine the format of the NGV PPDU as one of the format for HT and the format for LS.

In step S2730, the receiving STA may identify whether or not the frame format of the received NGV PPDU is a frame format for HT. In other words, the receiving STA may determine whether or not the frame format of the received NGV PPDU is a frame format for LS.

The receiving STA may use various methods for determining whether or not the frame format of the received NGV PPDU is a frame format for HT. For example, the receiving STA may identify constellation mapping of a symbol in a designated field that is included in the received NGV PPDU. For example, based on the constellation of a symbol in a designated field that is included in the received NGV PPDU being configured as BPSK, the receiving STA may identify that the frame format of the receiving NGV PPDU is a frame format for HT. As another example, based on the constellation of a symbol in a designated field that is included in the received NGV PPDU being configured as QPSK, the receiving STA may identify that the frame format of the receiving NGV PPDU is a frame format for LS.

In step S2740, when the frame format of the receiving NGV PPDU is a frame format for HT, the receiving STA may identify the midamble periodicity as a long period. For example, the midamble periodicity may be configured as one of a long period or a short period. For example, the long period may be set to '8' (or 8 symbols). And, the short period may be set to '4' (or 4 symbols). Therefore, the receiving STA may identify that the midamble periodicity is set to '8' (or 8 symbols). Additionally, when the length of one symbol (1 symbol) is set to 8 µs, the receiving STA may identify that the midamble periodicity is set to 64 us.

In step S2750, when the frame format of the receiving NGV PPDU is not a frame format for HT, the receiving STA may identify the midamble periodicity as a short period. In other words, when the frame format of the receiving NGV PPDU is a frame format for LS, the receiving STA may identify the midamble periodicity as a short period. For example, when the long period is set to '8' (or 8 symbols), and when the short period is set to '4' (or 4 symbols), the receiving STA may identify that the midamble periodicity is set to '4' (or 4 symbols). Additionally, when the length of one symbol (1 symbol) is set to 8 µs, the receiving STA may identify that the midamble periodicity is set to 32 us.

Figure 28:
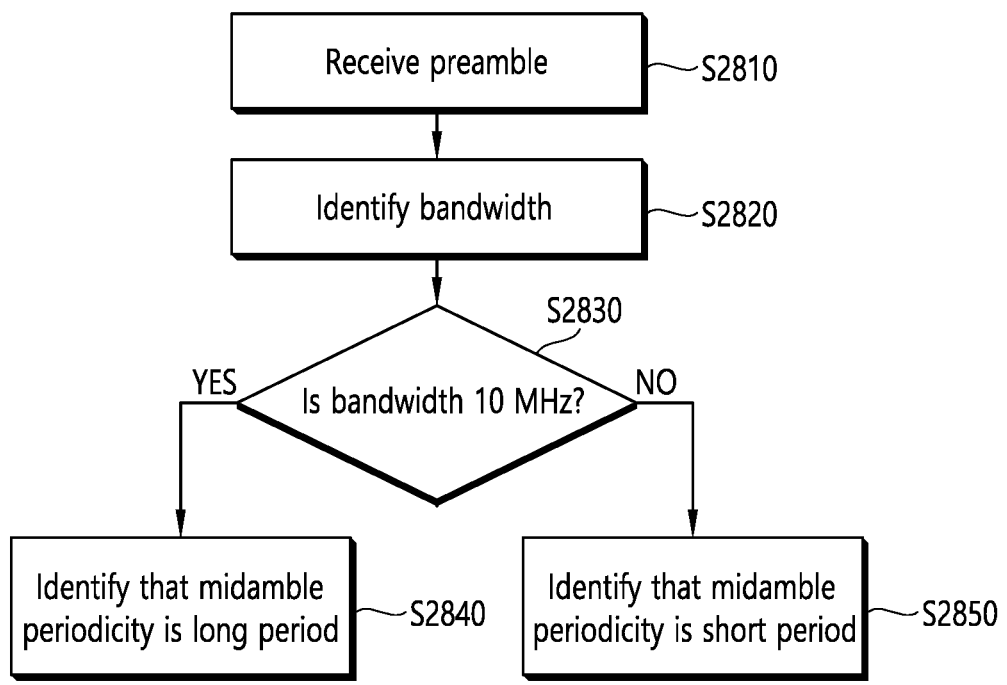
FIG. 28 is a flowchart for describing another operation of a receiving STA.

FIG. 28 is a flowchart for describing another operation of a receiving STA.

Referring to FIG. 28, in step S2810, the receiving STA may receive a preamble. Step S2810 may be related to step S2710 of FIG. 27.

In step S2820, the receiving STA may identify the bandwidth. According to an embodiment, the receiving STA may identify the bandwidth of the NGV PPDU based on the preamble of the received NGV PPDU.

For example, the receiving STA may identify the bandwidth of the NGV PPDU based on an NGV-SIG of the NGV PPDU. The NGV-SIG may include information related to the bandwidth of the NGV PPDU. Based on the information related to the bandwidth of the NGV PPDU, the receiving STA may determine the bandwidth of the NGV PPDU as one of 10 MHz or 20 MHz.

In step S2830, the receiving STA may identify whether or not the bandwidth of the received NGV PPDU is 10 MHz. In other words, the receiving STA may determine whether or not the bandwidth of the received NGV PPDU is 20 MHz.

The receiving STA may use various methods for determining whether or not the bandwidth of the received NGV PPDU is 10 MHz. For example, the receiving STA may identify an NGV-SIG that is included in the received NGV PPDU. The NGV-SIG may include information related to a bandwidth. For example, the NGV-SIG may include 1-bit information related to a bandwidth. Based on the 1-bit information being set to a first value (e.g., '0'), the receiving STA may identify that the bandwidth of the NGV PPDU is 10 MHz. And, based on the 1-bit information being set to a second value (e.g., '1'), the receiving STA may identify that the bandwidth of the NGV PPDU is 20 MHz.

In step S2840, when the bandwidth of the receiving NGV PPDU is 10 MHz, the receiving STA may identify the midamble periodicity as a long period. For example, the midamble periodicity may be configured as one of a long period or a short period. For example, the long period may be set to '8' (or 8 symbols). And, the short period may be set to '4' (or 4 symbols). Therefore, the receiving STA may identify that the midamble periodicity is set to 8 µs. Additionally, when the length of one symbol (1 symbol) is set to 8 µs, the receiving STA may identify that the midamble periodicity is set to 64 µs.

In step S2850, when the bandwidth of the receiving NGV PPDU is not 10 MHz, the receiving STA may identify the midamble periodicity as a short period. In other words, when the bandwidth of the receiving NGV PPDU is 20 MHz, the receiving STA may identify the midamble periodicity as a short period. For example, when the long period is set to '8' (or 8 symbols), and when the short period is set to '4' (or 4 symbols), the receiving STA may identify that the midamble periodicity is set to '4' (or 4 symbols). Additionally, when the length of one symbol (1 symbol) is set to 8 µs, the receiving STA may identify that the midamble periodicity is set to 32 µs.

Figure 29:
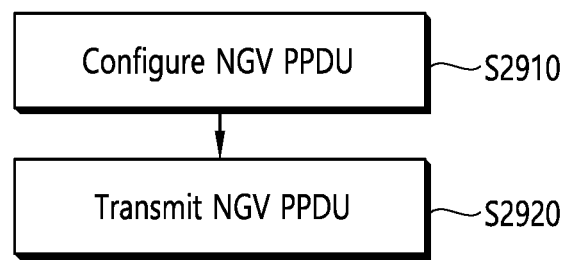
FIG. 29 is a flowchart for describing an operation of a transmitting STA.

FIG. 29 is a flowchart for describing an operation of a transmitting STA.

Referring to FIG. 29, in step S2910, a transmitting STA may configure/generate an NGV PPDU.

According to an embodiment, the NGV PPDU may include a preamble, a data field that is contiguous to the preamble, and a midamble that is contiguous to the data field.

For example, the preamble may include a legacy signal field, a repeated control field in which the legacy signal field is repeated, or an NGV signal field including control information for interpreting the NGV PPDU.

The legacy signal field may be transmitted through a first symbol. The legacy signal field may include an L-SIG.

The repeated control field may include an information field that is the same as the legacy signal field. Additionally, the repeated control field may be modulated by using the same scheme as the legacy signal field (e.g., BPSK). The repeated control field may be transmitted through a second symbol that is contiguous to the first symbol. The repeated control field may include an RL-SIG.

The NGV signal field may be related to transmission information. For example, the NGV signal field may include information related to a transmission periodicity of the midamble (or midamble periodicity).

The transmission periodicity of the midamble may be configured in symbol units of the data field. For example, when the transmission periodicity of the midamble is configured as 4 symbols, a midamble may be configured for each set of 4 data field symbols. For example, the transmission periodicity of the midamble may be configured as 4 symbols or 8 symbols. In other words, the transmission periodicity of the midamble may include 4 symbols or 8 symbols. For example, the transmission periodicity of the midamble may be configured as 4 symbols, 8 symbols or 16 symbols. In other words, the transmission periodicity of the midamble may include 4 symbols, 8 symbols or 16 symbols.

Information related to the transmission periodicity of a midamble may be configured as 2-bit information. For example, when the information related to the transmission periodicity of a midamble is set to a first value (e.g., '0'), the transmission periodicity of the midamble may be configured as 4 symbols. As another example, when the information related to the transmission periodicity of a midamble is set to a second value (e.g., '1'), the transmission periodicity of the midamble may be configured as 8 symbols. As yet another example, when the information related to the transmission periodicity of a midamble is set to a third value (e.g., '2'), the transmission periodicity of the midamble may be configured as 16 symbols.

The NGV signal field may be transmitted through a third symbol that is contiguous to the second symbol. The NGV signal field may include an NGV-SIG.

The data field may include a Physical Service Data Unit (PSDU). Additionally, the data field may further include a service field of 16 bits.

Subcarrier spacing of the NGV PPDU may be set to 156.25 kHz. Additionally, each of the first symbol to third symbol may be set to 8 µs. In other words, the first symbol may be set to 8 µs. The second symbol may be set to 8 µs. And, the third symbol may be set to 8 µs.

According to an embodiment, the preamble may include at least one first LTF. The midamble may include at least one second LTF. The at least one first LTF and the at least one second LTF may be configured based on the same LTF sequence. For example, the at least one first LTF and the at least one second LTF may be configured based on one of an NGV-LTF-1× format, an NGV-LTF-2× format, or a repeated NGV-LTF-2× format. Therefore, when the at least one first LTF is configured based on a sequence of the NGV-LTF-1× format, the at least one second LTF may also be configured based on a sequence of the NGV-LTF-1× format.

In step S2920, the transmitting STA may transmit the NGV PPDU to a receiving STA. For example, the transmitting STA may transmit the NGV PPDU to a receiving STA through a 5.9 GHz band.

Figure 30:
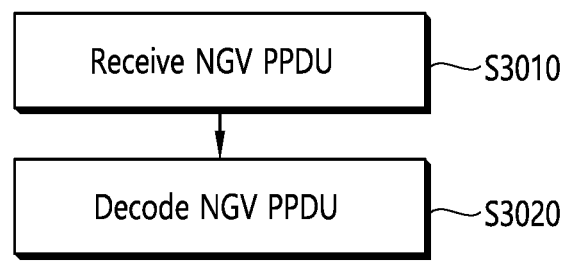
FIG. 30 is a flowchart for describing an operation of a receiving STA.

FIG. 30 is a flowchart for describing an operation of a receiving STA.

Referring to FIG. 30, in step S3010, a receiving STA may receive an NGV PPDU from a transmitting STA. According to an embodiment, the receiving STA may receive the NGV PPDU from the transmitting STA through a 5.9 GHz band.

According to an embodiment, the NGV PPDU may include a preamble, a data field that is contiguous to the preamble, and a midamble that is contiguous to the data field.

For example, the preamble may include a legacy signal field, a repeated control field in which the legacy signal field is repeated, or an NGV signal field including control information for interpreting the NGV PPDU.

The legacy signal field may be transmitted through a first symbol. The legacy signal field may include an L-SIG.

The repeated control field may include an information field that is the same as the legacy signal field. Additionally, the repeated control field may be modulated by using the same scheme as the legacy signal field (e.g., BPSK). The repeated control field may be transmitted through a second symbol that is contiguous to the first symbol. The repeated control field may include an RL-SIG.

The NGV signal field may be related to transmission information. For example, the NGV signal field may include information related to a transmission periodicity of the midamble (or midamble periodicity).

The transmission periodicity of the midamble may be configured in symbol units of the data field. For example, when the transmission periodicity of the midamble is configured as 4 symbols, a midamble may be configured for every 4 data field symbols. For example, the transmission periodicity of the midamble may be configured as 4 symbols or 8 symbols. In other words, the transmission periodicity of the midamble may include 4 symbols or 8 symbols. For example, the transmission periodicity of the midamble may be configured as 4 symbols, 8 symbols or 16 symbols. In other words, the transmission periodicity of the midamble may include 4 symbols, 8 symbols or 16 symbols.

Information related to the transmission periodicity of a midamble may be configured as 2-bit information. For example, when the information related to the transmission periodicity of a midamble is set to a first value (e.g., '0'), the transmission periodicity of the midamble may be configured as 4 symbols. As another example, when the information related to the transmission periodicity of a midamble is set to a second value (e.g., '1'), the transmission periodicity of the midamble may be configured as 8 symbols. As yet another example, when the information related to the transmission periodicity of a midamble is set to a third value (e.g., '2'), the transmission periodicity of the midamble may be configured as 16 symbols.

The NGV signal field may be transmitted through a third symbol that is contiguous to the second symbol. The NGV signal field may include an NGV-SIG.

The data field may include a Physical Service Data Unit (PSDU). Additionally, the data field may further include a service field of 16 bits.

Subcarrier spacing of the NGV PPDU may be set to 156.25 kHz. Additionally, each of the first symbol to third symbol may be set to 8 μs.

According to an embodiment, the preamble may include at least one first LTF. The midamble may include at least one second LTF. The at least one first LTF and the at least one second LTF may be configured based on the same LTF sequence. For example, the at least one first LTF and the at least one second LTF may be configured based on one of an NGV-LTF-1× format, an NGV-LTF-2× format, or a repeated NGV-LTF-2× format. Therefore, when the at least one first LTF is configured based on a sequence of the NGV-LTF-1× format, the at least one second LTF may also be configured based on a sequence of the NGV-LTF-1× format.

In step S3020, the receiving STA may interpret the NGV PPDU based on the NGV signal field. The receiving STA may identify the transmission periodicity of the midamble based on the NGV signal field. The receiving STA may obtain a second LTF that is included in the midamble. The receiving STA may interpret the data field of the NGV PPDU based on the second LTF.

The above-described technical features of the present specification may be applied to various device and methods. For example, the above-described technical features of the present specification may be performed/supported through FIG. 1 and/or FIG. 19. For example, the above-described technical features of the present specification may be applied to only part of FIG. 1 and/or FIG. 19. For example, the above-described technical features of the present specification may be implemented based on the processing chip(s) 114, 124 of FIG. 1, or implemented based on the processor(s) 111, 121 and the memory(s) 112, 122, or implemented based on the processor 610 and the memory 620 of FIG. 19. For example, a device of the present specification may include a memory, and a processor being operatively connected to the memory, wherein the processor may be configured to configure a Next Generation V2X Physical Protocol Data Unit (NGV PPDU), wherein the NGV PPDU may include a preamble, a data field that is contiguous to the preamble, or a midamble that is contiguous to the data field, wherein the preamble may include a legacy signal field, a repeated control field in which the legacy signal field is repeated, or an NGV signal field including control information for interpreting the NGV PPDU, wherein the NGV signal field may include information related to a transmission periodicity of the midamble, wherein the legacy signal field may be transmitted through a first symbol, wherein the repeated control field may be transmitted through a second symbol that is contiguous to the first symbol, and wherein the NGV signal field may be transmitted through a third symbol that is contiguous to the second symbol, and to transmit the NGV PPDU to a receiving STA.

The technical features of the present specification may be implemented based on a computer readable medium (CRM). For example, the CRM that is proposed in the present specification may store instructions performing an operation including the steps of configuring a Next Generation V2X Physical Protocol Data Unit (NGV PPDU), wherein the NGV PPDU may include a preamble, a data field that is contiguous to the preamble, or a midamble that is contiguous to the data field, wherein the preamble may include a legacy signal field, a repeated control field in which the legacy signal field is repeated, or an NGV signal field including control information for interpreting the NGV PPDU, wherein the NGV signal field may include information related to a transmission periodicity of the midamble, wherein the legacy signal field may be transmitted through a first symbol, wherein the repeated control field may be transmitted through a second symbol that is contiguous to the first symbol, and wherein the NGV signal field may be transmitted through a third symbol that is contiguous to the second symbol, and transmitting the NGV PPDU to a receiving STA. The instructions that are stored in the CRM of the present specification may be executed by at least one processor. At least one processor being related to the CRM of the present specification may be the processor(s) 111, 121 or processing chip(s) 114, 124 of FIG. 1, or the processor 610 of FIG. 19. Meanwhile, the CRM of the present specification may be the memory(s) 112, 122 of FIG. 1, or the memory 620 of FIG. 19, or a separate external memory/storage medium/disc, and so on.

The above-described technical characteristics of the present specification may be applied to various applications or business models. For example, the UE, Terminal, STA, Transmitter, Receiver, Processor, and/or Transceiver, and so on, that are described in the present specification may be applied to vehicles that support autonomous driving or prior art vehicles that support autonomous driving.

Figure 31:
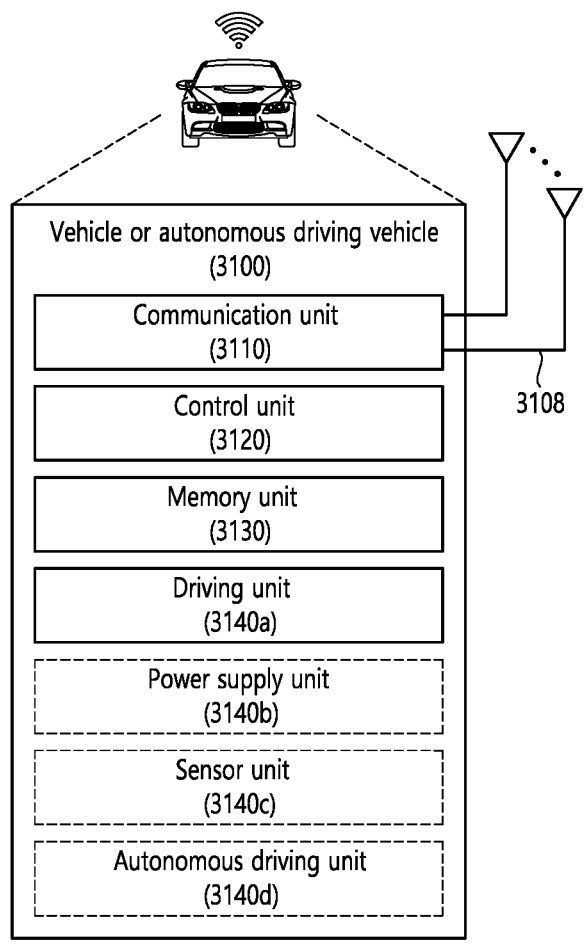
FIG. 31 shows a vehicle or an autonomous driving vehicle applied to the present specification.

FIG. 31 shows a vehicle or an autonomous driving vehicle applied to the present specification. The vehicle or autonomous driving vehicle may be implemented by a mobile robot, a car, a train, a manned/unmanned Aerial Vehicle (AV), a ship, and so on.

A memory unit 3130 shown in FIG. 31 may be included in the memory(s) 112, 122 shown in FIG. 1. Additionally, a communication unit 3110 shown in FIG. 31 may be include in the transceiver(s) 113, 123 and/or processor(s) 111, 121 shown in FIG. 1. Furthermore, the remaining devices that are shown in FIG. 31 may be included in the processor(s) 111, 121 shown in FIG. 1.

Referring to FIG. 31, a vehicle or autonomous driving vehicle 3100 may include an antenna unit 3108, a communication unit 3110, a control unit 3120, a memory unit 3130, a driving unit 3140a, a power supply unit 3140b, a sensor unit 3140c, and/or an autonomous driving unit 3140d. The antenna unit 3108 may be configured as a part of the communication unit 3110.

The communication unit 3110 may transmit and receive signals (e.g., data and control signals) to and from external devices such as other vehicles, BSs (e.g., gNBs and road side units), and servers. The control unit 3120 may perform various operations by controlling elements of the vehicle or the autonomous driving vehicle 3100. The control unit 3120 may include an Electronic Control Unit (ECU). The driving unit 3140a may cause the vehicle or the autonomous driving vehicle 3100 to drive on a road. The driving unit 3140a may include an engine, a motor, a powertrain, a wheel, a brake, a steering device, and so on. The power supply unit 3140b may supply power to the vehicle or the autonomous driving vehicle 3100 and include a wired/wireless charging circuit, a battery, and so on. The sensor unit 3140c may acquire a vehicle state, ambient environment information, user information, and so on. The sensor unit 3140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 3140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 3110 may receive map data, traffic information data, and so on, from an external server. The autonomous driving unit 3140d may generate an autonomous driving path and a driving plan from the obtained data. The control unit 3120 may control the driving unit 3140a such that the vehicle or the autonomous driving vehicle 3100 may move along the autonomous driving path according to the driving plan (e.g., speed/direction control). In the middle of autonomous driving, the communication unit 3110 may aperiodically/periodically acquire recent traffic information data from the external server and acquire surrounding traffic information data from neighboring vehicles. In the middle of autonomous driving, the sensor unit 3140c may obtain a vehicle state and/or surrounding environment information. The autonomous driving unit 3140d may update the autonomous driving path and the driving plan based on the newly obtained data/information. The communication unit 3110 may transfer information about a vehicle position, the autonomous driving path, and/or the driving plan to the external server. The external server may predict traffic information data using AI technology, and so on, based on the information collected from vehicles or autonomous driving vehicles and provide the predicted traffic information data to the vehicles or the autonomous driving vehicles.

An example of the present specification includes an example of FIG. 32, which will hereinafter be described in detail.

Figure 32:
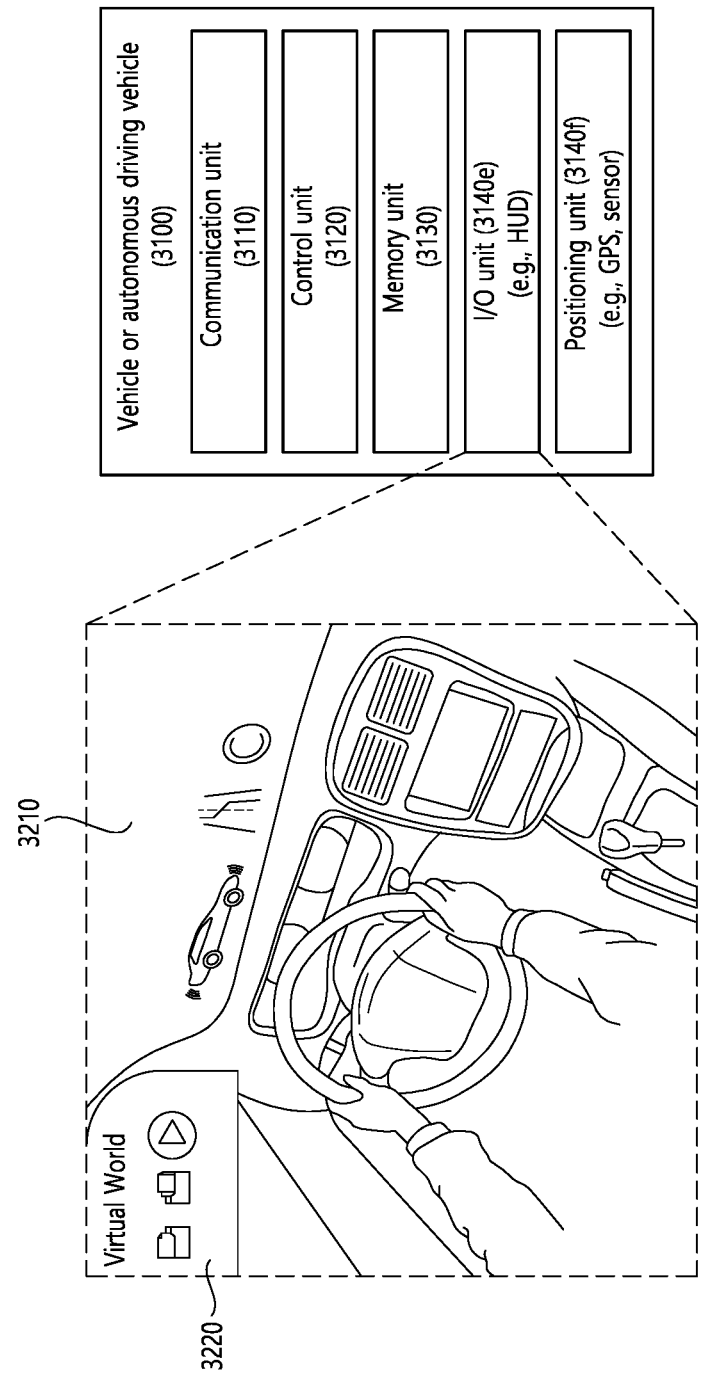
FIG. 32 shows an example of a vehicle that is applied to the present specification.

FIG. 32 shows an example of a vehicle that is applied to the present specification. The vehicle may be implemented as a transport means, an aerial vehicle, a ship, and so on.

Referring to FIG. 32, a vehicle 3100 may include a communication unit 3110, a control unit 3120, a memory unit 3130, an input/output (I/O) unit 3140e, and a positioning unit 3140f Each block/unit/device shown in FIG. 32 may be the same as each block/unit/device shown in FIG. 31, respectively.

The communication unit 3110 may transmit and receive signals (e.g., data and control signals) to and from external devices such as other vehicles or BSs. The control unit 3120 may perform various operations by controlling constituent elements of the vehicle 3100. The memory unit 3130 may store data/parameters/programs/code/commands for supporting various functions of the vehicle 3100. The I/O unit 3140e may output an AR/VR object based on information within the memory unit 3130. The I/O unit 3140e may include a HUD. The positioning unit 3140f may acquire information about the position of the vehicle 3100. The position information may include information about an absolute position of the vehicle 3100, information about the position of the vehicle 3100 within a traveling lane, acceleration information, and information about the position of the vehicle 3100 from a neighboring vehicle. The positioning unit 3140f may include a GPS and various sensors.

As an example, the communication unit 3110 of the vehicle 3100 may receive map information and traffic information from an external server and store the received information in the memory unit 3130. The positioning unit 3140f may obtain the vehicle position information through the GPS and various sensors and store the obtained information in the memory unit 3130. The control unit 3120 may generate a virtual object based on the map information, traffic information, and vehicle position information and the I/O unit 3140e may display the generated virtual object in a window in the vehicle 3210, 3220. The control unit 3120 may determine whether the vehicle 3100 normally drives within a traveling lane, based on the vehicle position information. If the vehicle 3100 abnormally exits from the traveling lane, the control unit 3120 may display a warning on the window in the vehicle through the I/O unit 3140e. In addition, the control unit 3120 may broadcast a warning message regarding driving abnormality to neighboring vehicles through the communication unit 3110. According to situation, the control unit 3120 may transmit the vehicle position information and the information about driving/vehicle abnormality to related organizations.

The foregoing technical features of this specification are applicable to various applications or business models.

For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed by a transmitting station (STA) of a Wireless Local Area Network (WLAN) system, the method comprising:

configuring a Next Generation V2X Physical Protocol Data Unit (NGV PPDU), wherein the NGV PPDU includes a preamble, an NGV data field that is contiguous to the preamble, and a midamble that is contiguous to the NGV data field, wherein the preamble includes a legacy signal field, a repeated control field in which the legacy signal field is repeated, and an NGV signal field including control information for interpreting the NGV PPDU, wherein the NGV signal field includes periodicity information related to a transmission periodicity of the midamble, wherein the periodicity information is configured as 2-bit information indicating one of available periodicities of the midamble, wherein the available periodicities include 4 symbols, 8 symbols, and 16 symbols, wherein the legacy signal field is transmitted through a first symbol, wherein the repeated control field is transmitted through a second symbol that is contiguous to the first symbol, and wherein the NGV signal field is transmitted through a third symbol that is contiguous to the second symbol; and transmitting the NGV PPDU to a receiving STA.

2. The method of claim 1, wherein the preamble includes at least one first Long Training field (LTF), and wherein the midamble includes at least one second LTF.

3. The method of claim 1, wherein each of the first symbol, the second symbol, and the third symbol has a symbol duration of 8 µs.

4. The method of claim 1, wherein subcarrier spacing of the NGV PPDU is set to 156.25 kHz.

5. The method of claim 1, wherein the NGV data field includes a Physical Service Data Unit (PSDU).

6. A method performed by a receiving station (STA) of a Wireless Local Area Network (WLAN) system, the method comprising:

receiving a Next Generation V2X Physical Protocol Data Unit (NGV PPDU), wherein the NGV PPDU includes a preamble, an NGV data field that is contiguous to the preamble, and a midamble that is contiguous to the NGV data field, wherein the preamble includes a legacy signal field, a repeated control field in which the legacy signal field is repeated, and an NGV signal field including control information for interpreting the NGV PPDU, wherein the NGV signal field includes periodicity information related to a transmission periodicity of the midamble, wherein the periodicity information is configured as 2-bit information indicating one of available periodicities of the midamble, wherein the available periodicities include 4 symbols, 8 symbols, and 16 symbols, wherein the legacy signal field is received through a first symbol, wherein the repeated control field is received through a second symbol that is contiguous to the first symbol, and wherein the NGV signal field is received through a third symbol that is contiguous to the second symbol; and decoding the NGV PPDU based on the NGV signal field.

7. A transmitting station (STA) used in a Wireless Local Area Network (WLAN) system, the transmitting STA comprising:

a transceiver transmitting and/or receiving a wireless signal; and a processor being operatively connected to the transceiver, wherein the processor is configured to:

configure a Next Generation V2X Physical Protocol Data Unit (NGV PPDU), wherein the NGV PPDU includes a preamble, an NGV data field that is contiguous to the preamble, and a midamble that is contiguous to the NGV data field, wherein the preamble includes a legacy signal field, a repeated control field in which the legacy signal field is repeated, and an NGV signal field including control information for interpreting the NGV PPDU, wherein the NGV signal field includes periodicity information related to a transmission periodicity of the midamble, wherein the periodicity information is configured as 2-bit information indicating one of available periodicities of the midamble, wherein the available periodicities include 4 symbols, 8 symbols, and 16 symbols, wherein the legacy signal field is transmitted through a first symbol, wherein the repeated control field is transmitted through a second symbol that is contiguous to the first symbol, and wherein the NGV signal field is transmitted through a third symbol that is contiguous to the second symbol, and transmit the NGV PPDU to a receiving STA.

8. The transmitting STA of claim 7, wherein the preamble includes at least one first Long Training field (LTF), and wherein the midamble includes at least one second LTF.

9. The transmitting STA of claim 7, wherein each of the first symbol, the second symbol, and the third symbol has a symbol duration of 8 µs.

10. The transmitting STA of claim 7, wherein subcarrier spacing of the NGV PPDU is set to 156.25 kHz.

11. The transmitting STA of claim 7, wherein the NGV data field includes a Physical Service Data Unit (PSDU).

12. The method of claim 1, the 2-bit information has a value of zero (0) to indicate the 4 symbols, the 2-bit information has a value of one (1) to indicate the 8 symbols, and the 2-bit information has a value of three (3) to indicate the 16 symbols.

13. The method of claim 6, the 2-bit information has a value of zero (0) to indicate the 4 symbols, the 2-bit information has a value of one (1) to indicate the 8 symbols, and the 2-bit information has a value of three (3) to indicate the 16 symbols.

14. The transmitting STA of claim 7, the 2-bit information has a value of zero (0) to indicate the 4 symbols, the 2-bit information has a value of one (1) to indicate the 8 symbols, and the 2-bit information has a value of three (3) to indicate the 16 symbols.

* * * * *